(12) United States Patent
Biasini et al.

(10) Patent No.: US 12,131,223 B1
(45) Date of Patent: Oct. 29, 2024

(54) MULTI-THREADING PERFORMANCE IMPROVEMENTS FOR RECOGNITION OF OPTICAL PATTERNS IN IMAGES

(71) Applicant: Scandit AG, Zürich (CH)

(72) Inventors: Marco Biasini, Zürich (CH); Vitali Samurov, Tampere (FI); Iciar Martinez, Madrid (ES)

(73) Assignee: Scandit AG, Zurich (CH)

( * ) Notice: Subject to any disclaimer, the term of this patent is extended or adjusted under 35 U.S.C. 154(b) by 0 days.

(21) Appl. No.: 18/472,876

(22) Filed: Sep. 22, 2023

Related U.S. Application Data

(63) Continuation of application No. 17/837,870, filed on Jun. 10, 2022, now Pat. No. 11,803,719, which is a continuation of application No. 17/396,123, filed on Aug. 6, 2021, now Pat. No. 11,403,477, which is a continuation-in-part of application No. 17/186,898, filed on Feb. 26, 2021, now Pat. No. 11,290,643, and a continuation-in-part of application No. 17/105,082, filed on Nov. 25, 2020, now Pat. No. 11,087,105.

(Continued)

(51) Int. Cl.
```
G06K 7/14      (2006.01)
G06F 1/16      (2006.01)
G06K 7/10      (2006.01)
H04N 23/62     (2023.01)
H04N 23/67     (2023.01)
```

(52) U.S. Cl.
CPC ........... *G06K 7/146* (2013.01); *G06F 1/1605* (2013.01); *G06F 1/1626* (2013.01); *H04N 23/62* (2023.01); *H04N 23/67* (2023.01); *G06K 2007/10524* (2013.01); *G06K 7/1413* (2013.01)

(58) Field of Classification Search
CPC .. G06K 7/146; G06K 7/1478; G06K 7/10811; G06K 7/10722; G06F 1/605; G06F 1/1626; H04N 23/67; H04N 23/62
USPC ....... 348/207.99, 207.9; 235/462.11, 462.24, 235/462.32, 462.45
See application file for complete search history.

(56) References Cited

U.S. PATENT DOCUMENTS

| | | |
|---|---|---|
| 4,167,756 A | 9/1979 | Smith |
| D344,261 S | 2/1994 | Watanabe |
| (Continued) | | |

FOREIGN PATENT DOCUMENTS

| | | |
|---|---|---|
| EP | 3167404 | 5/2017 |
| EP | 2195123 | 5/2018 |
| (Continued) | | |

OTHER PUBLICATIONS

Barcode and Zone OCR Capture, Docsvault, Available Online at: https://www.docsvault.com/docs/barcode-zone-ocr-capture.pdf, Dec. 22, 2021, 2 pages.

(Continued)

*Primary Examiner* — Edwyn Labaze
(74) *Attorney, Agent, or Firm* — Kilpatrick Townsend & Stockton LLP

(57) ABSTRACT

An image of a scene is acquired by a camera of a mobile device. Hardware information is used to identify a higher-performance core and lower-performance core of a multi-core processor. An application for optical pattern scanning, such as barcode scanning, is restricted to run on the higher-performance core, for decoding an optical pattern in the image of the scene.

20 Claims, 13 Drawing Sheets

Related U.S. Application Data

(60) Provisional application No. 63/044,635, filed on Jun. 26, 2020, provisional application No. 63/025,850, filed on May 15, 2020.

(56) References Cited

U.S. PATENT DOCUMENTS

| | | | |
|---|---|---|---|
| 5,744,815 | A | 4/1998 | Gurevich et al. |
| D473,872 | S | 4/2003 | Ausems et al. |
| 6,580,453 | B1 | 6/2003 | Hirasawa |
| 6,688,525 | B1 * | 2/2004 | Nelson ............ G06K 7/1093 |
| | | | 235/462.23 |
| D576,197 | S | 9/2008 | Takagi |
| 7,457,407 | B2 | 11/2008 | Sun et al. |
| D654,931 | S | 2/2012 | Lemelman et al. |
| D658,174 | S | 4/2012 | Tasselli et al. |
| D659,564 | S | 5/2012 | Baxter |
| 8,223,203 | B2 | 7/2012 | Ohsumi et al. |
| D667,823 | S | 9/2012 | Merenda |
| D670,278 | S | 11/2012 | Hamann |
| D672,386 | S | 12/2012 | Matunuma et al. |
| D678,870 | S | 3/2013 | Fathollahi |
| D678,936 | S | 3/2013 | Oliver |
| D685,360 | S | 7/2013 | Chen et al. |
| D688,654 | S | 8/2013 | Stevinson |
| 8,596,540 | B2 | 12/2013 | Adelmann |
| D698,772 | S | 2/2014 | Merenda |
| D710,343 | S | 8/2014 | Chandler, Jr. et al. |
| D710,346 | S | 8/2014 | Smith et al. |
| 8,798,453 | B2 | 8/2014 | Lawton |
| D716,285 | S | 10/2014 | Chaney et al. |
| D716,785 | S | 11/2014 | White |
| D717,287 | S | 11/2014 | Macrina et al. |
| D717,304 | S | 11/2014 | Yturralde et al. |
| D719,166 | S | 12/2014 | Brown et al. |
| D719,167 | S | 12/2014 | Brown et al. |
| D724,573 | S | 3/2015 | Stevinson |
| D726,701 | S | 4/2015 | Stevinson |
| 9,019,420 | B2 | 4/2015 | Hurst et al. |
| D728,551 | S | 5/2015 | Saeki et al. |
| D732,011 | S | 6/2015 | Stevinson |
| D733,112 | S | 6/2015 | Chaney et al. |
| D734,336 | S | 7/2015 | Mistkawi et al. |
| D744,470 | S | 12/2015 | Stevinson |
| D748,085 | S | 1/2016 | Merenda |
| D754,114 | S | 4/2016 | Curtis et al. |
| D754,650 | S | 4/2016 | Curtis et al. |
| D759,004 | S | 6/2016 | Stevinson |
| D760,209 | S | 6/2016 | Weng et al. |
| D760,212 | S | 6/2016 | Mao et al. |
| D760,710 | S | 7/2016 | Ozolins et al. |
| D761,240 | S | 7/2016 | Ozolins et al. |
| D768,617 | S | 10/2016 | Merenda |
| D771,631 | S | 11/2016 | Fitch et al. |
| 9,654,675 | B2 | 5/2017 | Kessler |
| 9,659,204 | B2 | 5/2017 | Wu et al. |
| 9,836,635 | B2 | 12/2017 | Negro et al. |
| 10,013,643 | B2 | 7/2018 | Yellapragada et al. |
| 10,191,242 | B2 | 1/2019 | Palmeri |
| 10,200,599 | B1 | 2/2019 | Baldwin |
| 10,229,301 | B2 | 3/2019 | Cumoli et al. |
| D860,180 | S | 9/2019 | Lehmann et al. |
| D862,441 | S | 10/2019 | Eppler et al. |
| 10,426,442 | B1 | 10/2019 | Schnorr |
| 10,452,959 | B1 | 10/2019 | Gautam et al. |
| 10,558,844 | B2 | 2/2020 | D'ercoli et al. |
| 10,621,435 | B2 | 4/2020 | Bridges et al. |
| 10,818,014 | B2 | 10/2020 | Xu et al. |
| 10,846,561 | B1 | 11/2020 | Floerkemeier et al. |
| 10,963,658 | B1 | 3/2021 | Bloch et al. |
| 11,003,891 | B2 | 5/2021 | Chen |
| 11,087,105 | B1 | 8/2021 | Biasini et al. |
| 11,216,628 | B2 | 1/2022 | Scherly et al. |
| 11,244,147 | B2 | 2/2022 | Floerkemeier et al. |
| 11,290,643 | B1 | 3/2022 | Tullis et al. |
| 11,295,163 | B1 | 4/2022 | Schoner et al. |
| 11,403,477 | B1 | 8/2022 | Biasini et al. |
| 2003/0059124 | A1 | 3/2003 | Center, Jr. |
| 2004/0193538 | A1 | 9/2004 | Raines |
| 2004/0206822 | A1 | 10/2004 | Crandall |
| 2006/0011724 | A1 | 1/2006 | Joseph et al. |
| 2006/0249581 | A1 | 11/2006 | Smith |
| 2007/0116454 | A1 | 5/2007 | Tsai |
| 2009/0002797 | A1 | 1/2009 | Kwong et al. |
| 2009/0033786 | A1 | 2/2009 | Finkelstein et al. |
| 2009/0108071 | A1 | 4/2009 | Carlson |
| 2009/0212113 | A1 | 8/2009 | Chiu et al. |
| 2009/0304234 | A1 | 12/2009 | Kondo et al. |
| 2010/0102129 | A1 | 4/2010 | Drzymala et al. |
| 2010/0328420 | A1 | 12/2010 | Roman |
| 2011/0007205 | A1 | 1/2011 | Lee |
| 2011/0043683 | A1 | 2/2011 | Beach et al. |
| 2011/0081946 | A1 | 4/2011 | Singh |
| 2011/0168776 | A1 | 7/2011 | Jalali et al. |
| 2013/0076697 | A1 | 3/2013 | Goertz et al. |
| 2013/0112750 | A1 | 5/2013 | Negro et al. |
| 2013/0206839 | A1 | 8/2013 | Gao |
| 2013/0329115 | A1 | 12/2013 | Palmeri |
| 2014/0025973 | A1 | 1/2014 | Schillings et al. |
| 2014/0027503 | A1 | 1/2014 | Kennedy et al. |
| 2014/0097251 | A1 * | 4/2014 | Joussen ............ G06K 7/1491 |
| | | | 235/462.07 |
| 2014/0168468 | A1 | 6/2014 | Levoy et al. |
| 2014/0171150 | A1 | 6/2014 | Hurst et al. |
| 2014/0232930 | A1 | 8/2014 | Anderson |
| 2014/0247278 | A1 | 9/2014 | Samara |
| 2014/0285913 | A1 | 9/2014 | Palmeri |
| 2014/0327815 | A1 | 11/2014 | Auger |
| 2015/0048167 | A1 | 2/2015 | Russell et al. |
| 2015/0053765 | A1 | 2/2015 | Powell et al. |
| 2015/0116547 | A1 | 4/2015 | Laroia |
| 2015/0220766 | A1 | 8/2015 | Russell et al. |
| 2016/0042315 | A1 | 2/2016 | Field-Darragh et al. |
| 2016/0070944 | A1 | 3/2016 | McCloskey et al. |
| 2016/0077307 | A1 | 3/2016 | Palmeri |
| 2016/0104021 | A1 | 4/2016 | Negro et al. |
| 2016/0171707 | A1 | 6/2016 | Schwartz |
| 2016/0188941 | A1 | 6/2016 | Todeschini et al. |
| 2016/0219218 | A1 | 7/2016 | Kinoshita |
| 2016/0253599 | A1 | 9/2016 | Lang et al. |
| 2016/0307006 | A1 | 10/2016 | Wang |
| 2016/0321819 | A1 | 11/2016 | Morgan-Mar et al. |
| 2016/0323508 | A1 | 11/2016 | Ayalasomayajula et al. |
| 2016/0366348 | A1 | 12/2016 | Dixon et al. |
| 2017/0013179 | A1 | 1/2017 | Kang et al. |
| 2017/0032311 | A1 | 2/2017 | Rizzolo et al. |
| 2017/0041540 | A1 | 2/2017 | Foster et al. |
| 2017/0243097 | A1 | 8/2017 | Loy et al. |
| 2018/0081417 | A1 | 3/2018 | Chan et al. |
| 2018/0122194 | A1 | 5/2018 | Schoner |
| 2018/0137319 | A1 | 5/2018 | Giordano et al. |
| 2018/0157885 | A1 | 6/2018 | Gurzumar |
| 2018/0314908 | A1 | 11/2018 | Lam |
| 2018/0342050 | A1 | 11/2018 | Fitzgerald et al. |
| 2019/0188435 | A1 | 6/2019 | Davis et al. |
| 2019/0213523 | A1 | 7/2019 | Adato et al. |
| 2019/0244043 | A1 | 8/2019 | Bradley et al. |
| 2019/0325183 | A1 | 10/2019 | Tscherepanow et al. |
| 2019/0354923 | A1 | 11/2019 | Taira et al. |
| 2020/0042803 | A1 | 2/2020 | Yamaguchi |
| 2020/0084375 | A1 | 3/2020 | Tadano et al. |
| 2021/0125141 | A1 | 4/2021 | Lipsey et al. |
| 2021/0150618 | A1 | 5/2021 | Glaser et al. |
| 2021/0158278 | A1 | 5/2021 | Bogolea et al. |
| 2021/0192162 | A1 | 6/2021 | Rodriguez et al. |

FOREIGN PATENT DOCUMENTS

| | | |
|---|---|---|
| JP | 2004032507 | 1/2004 |
| JP | 4966464 | 7/2012 |
| KR | 20020077090 | 10/2002 |
| KR | 20060102957 | 9/2006 |

(56) References Cited

FOREIGN PATENT DOCUMENTS

| WO | 0131893 | 5/2001 |
|---|---|---|
| WO | 2016007662 | 1/2016 |
| WO | 2019135163 | 7/2019 |

OTHER PUBLICATIONS

"Code Reader 4405 User Manual", Version 03, Release date: Jan. 2016,. Code Corporation, Accessed on: Dec. 22, 2020 [Online]. Retrieved from: https://web.archive.org/web/20181223184651/http://www.codecorp.com/products.php?id=167, 16 pages.

Basilico , "Flens—The First Flashlight Booster for Smartphones", Available Online at: https://www.kickstarter.com/projects/basilico/flens-the-first-flashlight-booster-for-smartphones, Accessed from Internet on: Mar. 26, 2021, 26 pages.

Brownlee , "Deep Learning Models for Human Activity Recognition", Deep Learning for Time Series, Available Online at: https://machinelearningmastery.com/deep-learning-models-for-human-activity-recognition/, Sep. 26, 2018, 16 pages.

"Computer Vision and Augmented Reality for Enterprise Applications", Scandit, Available Online at: https://www.scandit.com/resources/videos/computer-vision-and-augmented-reality-for-enterprise-applications, Jun. 6, 2018, pp. 1-2.

"ISBN Scan—OCR/BarcodeScanner", App Store Preview, Leontec, Designed for iPad, Available Online at: https://apps.apple.com/us/app/isbn-scan-ocr-barcodescanner/id891627785, Accessed from Internet on Jan. 17, 2022, 3 pages.

"Linea Pro Extreme Rugged Case", Infinite Peripherals, iOS Accessories, Linea Pro and Infinea Tab Accessories, Available Online at: https://web.archive.org/web/20150825044354/http://ipcprint.com/linea-pro-extreme-rugged-case.html, Accessed from Internet on Dec. 24, 2020, pp. 1-3.

International Search Report and Written Opinion mailed Aug. 12, 2021 in PCT/US2021/025212, 11 pages.

International Preliminary Report on Patentability for PCT/US2021/025212 mailed Oct. 13, 2022, 8 pages.

International Search Report and Written Opinion mailed Feb. 27, 2013 in International Patent Application No. PCT/US2012/043184, filed Jun. 19, 2012, 7 pages.

International Preliminary Report on Patentability mailed Dec. 23, 2013 in International Patent Application No. PCT/US2012/043184, filed Jun. 19, 2012, 5 pages.

International Search Report and Written Opinion mailed Aug. 1, 2019 in International Patent Application No. PCT/IB2019/000049, filed Jan. 8, 2019, 15 pages.

International Preliminary Report on Patentability mailed Jul. 14, 2020 in International Patent Application No. PCT/IB2019/000049, filed Jan. 8, 2019, 10 pages.

Scandit, "Scandit Augmented Reality Retail Price Label Verification", posted Sep. 26, 2018, retrieved on Aug. 4, 2020 from https://www.scandit.com/resources/videos/scandit-augmented-reality-retail-price-label-verification/, 5 pages.

"Scandit Augmented Reality for Smart Devices", Scandit, Available Online at: https://www.scandit.com/resources/videos/scandit-augmented-reality-for-smart-devices/, Oct. 2, 2019, pp. 1-2.

"Scandit Augmented Reality Retail Click and Collect", Scandit, Available Online at: https://www.scandit.com/resources/videos/scandit-augmented-reality-retail-click-and-collect/, Sep. 26, 2018, pp. 1-2.

"Scandit Augmented Reality Retail Shelf Management", Scandit, Available Online at: https://www.scandit.com/resources/videos/scandit-augmented-reality-retail-shelf-management/, Sep. 26, 2018, pp. 1-2.

"Scandit Augmented Retail Product Information Using AR", Scandit, Available Online at: https://www.scandit.com/resources/videos/scandit-augmented-retail-product-information-using-ar/, Sep. 26, 2018, pp. 1-2.

"Structure of the IMEI and IMEISV (IMEI Software Version)", Available Online at: https://en.wikipedia.org/wiki/International_Mobile_Equipment_Identity#Structure_of_the_IMEI_and_ IMEISV_ (IMEI_software_version), Nov. 29, 2021, 2 pages.

"Use OCR to Scan ISBN or UPC Number When There is No Barcode", A sellertool User Guide, Available Online at: https://www.asellertool.com/manual/1/en/topic/ocr-to-capture-isbn-number-if-no-barcode, Feb. 9, 2017, 12 pages.

U.S. Appl. No. 17/396,123, filed Aug. 6, 2021, Non-Final Rejection mailed Dec. 2, 2021, all pages.

U.S. Appl. No. 17/396,123, filed Aug. 6, 2021, Notice of Allowance mailed Mar. 9, 2022, all pages.

U.S. Appl. No. 17/186,898, filed Feb. 26, 2021, Non-Final Rejection mailed Apr. 29, 2021, all pages.

U.S. Appl. No. 17/186,898, filed Feb. 26, 2021, Final Rejection mailed Sep. 27, 2021, all pages.

U.S. Appl. No. 17/186,898, filed Feb. 26, 2021, Notice of Allowance mailed Nov. 17, 2021, all pages.

U.S. Appl. No. 17/105,082, filed Nov. 25, 2020, Non-Final Rejection mailed Jan. 13, 2021, all pages.

U.S. Appl. No. 17/105,082, filed Nov. 25, 2020, Notice of Allowance mailed Mar. 24, 2021, all pages.

U.S. Appl. No. 17/541,957, filed Dec. 3, 2021, Notice of Allowance mailed Oct. 18, 2023, all pages.

\* cited by examiner

MULTI-THREADING PERFORMANCE IMPROVEMENTS FOR RECOGNITION OF OPTICAL PATTERNS IN IMAGES

CROSS-REFERENCE TO RELATED APPLICATIONS

This application is a continuation of U.S. patent application Ser. No. 17/837,870, filed on Jun. 10, 2022, entitled "Performance Improvements For Recognition Of Optical Patterns In Images Using Incremental Magnification," which is a continuation of U.S. patent application Ser. No. 17/396,123, filed Aug. 6, 2021, entitled "Performance Improvements For Recognition Of Optical Patterns In Images," now U.S. Pat. No. 11,403,477, issued Aug. 2, 2022, which application is a continuation-in-part of U.S. patent application Ser. No. 17/105,082, filed Nov. 25, 2020, entitled "Performance Improvements For Recognition Of Optical Patterns In Images," now U.S. Pat. No. 11,087,105, issued Aug. 10, 2021, which application claims priority to and the benefit of U.S. Provisional Patent Application No. 63/044,635, filed Jun. 26, 2020, and U.S. Provisional Patent Application No. 63/025,850, filed May 15, 2020, the disclosures of which are incorporated by reference for all purposes. U.S. patent application Ser. No. 17/396,123 is a continuation-in-part of U.S. patent application Ser. No. 17/186,898, filed Feb. 26, 2021, entitled "Efficient Digital Camera Image Acquisition And Analysis," now U.S. Pat. No. 11,290,643, issued Mar. 29, 2022, which application claims priority to and the benefit of U.S. Provisional Patent Application No. 63/044,635, filed Jun. 26, 2020, the disclosures of which are incorporated by reference for all purposes.

BACKGROUND

This disclosure generally relates to decoding optical patterns in a scene or image, and more specifically, and without limitation, to decoding barcodes. Barcodes have traditionally been scanned using a specialized scanner. For example, a barcode scanner comprising a laser is used to shine light on a barcode, and reflected light from the barcode is detected and used to decode the barcode. As mobile devices (e.g., smartphones and tablets) with cameras have become more common, mobile devices are being used to decode codes by acquiring an image of a code and using image analysis to decode the code. An example of a method for using as smartphone to decode a barcode is provided in U.S. Pat. No. 8,596,540, granted on Dec. 3, 2013.

BRIEF SUMMARY

Techniques described herein include systems and corresponding methods for the automated analysis of an image for recognition of a pattern. In particular, and without limitation, included herein are systems that transform an image for the purpose of measuring significant characteristics of the image. The images analyzed and processed herein are images that are representative of a "real" scene (such as images obtained by a camera, scanner, or image detector), including obtained images of places and things, wherein the image represents the actual scene.

Mobile devices having a camera, and being capable of hosting mobile applications, offer a flexible and scalable solution for optical pattern decoding. Such devices detect and decode an optical pattern appearing in a real scene, rather than a single optical pattern isolated from its environment. Scenes also may include multiple optical patterns to be distinguished when the scene includes different types of optical patterns, different orientations, different arrangements, or many optical patterns encoding multiple different types of information. Implementation of scanning applications is not straightforward, and standard device features, such as auto-focus or auto-exposure features, zoom controls, and multi-core processing, may introduce latency and may reduce performance of scanning processes. To that end, certain embodiments of the present disclosure are addressed at techniques for improving performance of scanning processes for decoding optical patterns appearing in real scenes.

In some embodiments, a mobile device is used for decoding an optical pattern in a real scene. A mobile device may include a display, a camera, one or more processors in communication with the camera and with the display, and one or more memory devices storing instructions. The instructions, when executed by the one or more processors, may cause the mobile device to disable an automatic focus system of the camera controlling a focal position of the camera. The instructions, when executed by the one or more processors, may cause the mobile device to detect an optical pattern in a scene using the camera, the optical pattern encoding an object identifier. The instructions, when executed by the one or more processors, may cause the mobile device to present a visual indication on the display that the optical pattern is not decoded. The instructions, when executed by the one or more processors, may cause the mobile device to receive a user action. The instructions, when executed by the one or more processors, may cause the mobile device to execute a focus cycle of the camera after receiving the user action. The focus cycle may change the focal position of the camera from a first focal position to a second focal position. The second focal position may correspond to the optical pattern being in focus in the scene. The instructions, when executed by the one or more processors, may cause the mobile device to acquire an image of the scene using the camera at the second focal position. The instructions, when executed by the one or more processors, may also cause the mobile device to decode the optical pattern in the image of the scene, generating the object identifier.

In some embodiments, the user action may be received via the display after detecting the optical pattern in the scene. The scene may be a first scene, wherein the user action may include motion of the mobile device, and wherein the instructions, when executed, may further cause the one or more processors to detect a scene change from the first scene to a second scene. Detecting the scene change may include detecting motion of the mobile device exceeding a threshold motion, or detecting the scene change based on motion blur in an image of the scene acquired by the camera. The image of the scene may be a second image. Detecting the optical pattern in the scene may include acquiring a first image of the scene using the camera wherein the focal position of the camera is at the first focal position, detecting the optical pattern in the first image without decoding the optical pattern, and ascertaining that the optical pattern is not in focus in the first image. Ascertaining that the optical pattern is not in focus in the first image may include ascertaining a resolution of the optical pattern in the first image and determining that the resolution of the optical pattern in the first image is below a minimum resolution for decoding the optical pattern. The optical pattern may be a first optical pattern. The object identifier may be a first object identifier. The instructions, when executed, may further cause the one or more processors to detect a second optical pattern in the first image before receiving the user action, the second optical pattern encoding a second object identifier and decode the second optical pattern in the first image, generating the second object identifier.

In certain embodiments, a method implemented by a computer system includes one or more operations of the embodiments and their variations, described above.

In certain embodiments, a computer-readable storage medium stores computer-executable instructions that, when executed, cause one or more processors of a computer system to perform one or more operations of the embodiments and their variations, described above.

BRIEF DESCRIPTION OF THE DRAWINGS

The present disclosure is described in conjunction with the appended figures.

Figure 1:
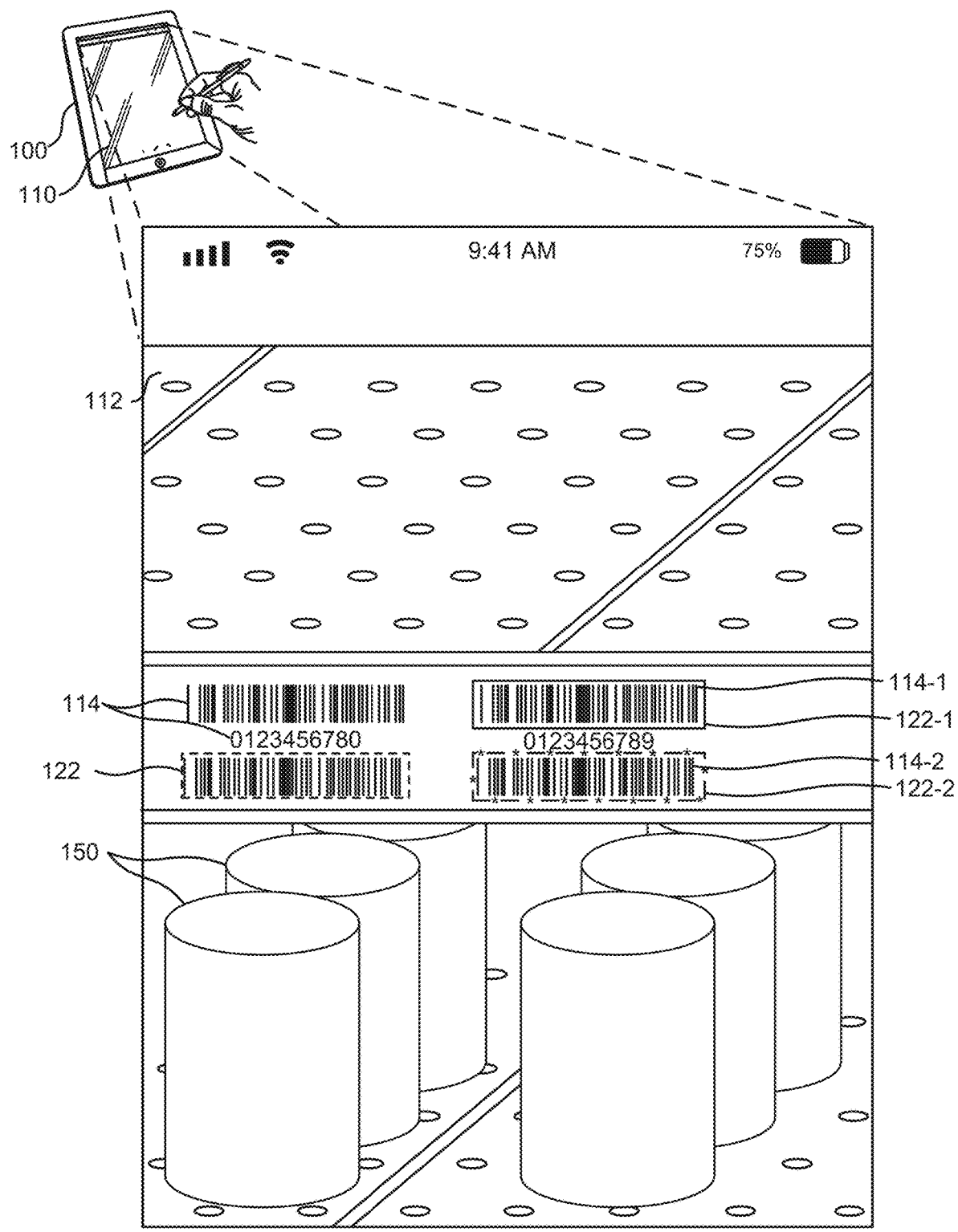
FIG. 1 depicts an example technique for automated recognition and decoding of a pattern in an image containing multiple patterns, in accordance with some embodiments.

In the appended figures, similar components and/or features may have the same reference label. Further, various components of the same type may be distinguished by following the reference label by a dash and a second label that distinguishes among the similar components. If only the first reference label is used in the specification, the description is applicable to similar components having the same first reference label irrespective of the second reference label.

DETAILED DESCRIPTION OF THE FIGURES

The ensuing description provides preferred exemplary embodiment(s) only, and is not intended to limit the scope, applicability, or configuration of the disclosure. Rather, the ensuing description of the preferred exemplary embodiment(s) will provide those skilled in the art with an enabling description for implementing a preferred exemplary embodiment. It is understood that various changes may be made in the function and arrangement of elements without departing from the spirit and scope as set forth in the appended claims.

Generally techniques are described for improving performance of scanning processes for detection and decoding optical patterns in images, in the context of discrete optical patterns appearing in a real scene including one or more patterns, objects, and/or people in a real environment. As an illustrative example, a mobile electronic device, such as a smartphone or tablet, captures and/or receives images taken using a camera of the mobile electronic device. The images include, among other elements in the field of view of the camera, one or more optical patterns, such as barcodes. The mobile electronic device implements one or more approaches to improve decoding performance for optical patterns that are detected but cannot be decoded, for example, due to being out of focus, being underexposed or overexposed, or being too small in an image. After applying an approach to improve the performance of scanning the optical pattern, the optical pattern is decoded. The techniques described herein may be applied to improve exposure strategies, zoom strategies, focus strategies, and multi-threading strategies, among others. In this way, certain embodiments exhibit improved performance in scanning optical patterns in a real scene, for example, by reducing the latency of scanning, a number of repeated image acquisitions, and/or the computational resources applied to scanning, which can reduce the energy demands of scanning optical patterns to recover encoded information.

The techniques described in the following paragraphs, in reference to the appended figures, constitute multiple technical improvements of optical pattern processing. For example, computation resources may be conserved by triggering focus cycles only after in-focus optical patterns have been successfully decoded. As another example, a system may capture multiple images of a scene at multiple exposure levels, thereby enable scanning of multiple optical patterns at different light levels in the same real scene. Implementing the performance improvement techniques described herein, alone or in combination, provides a potential for significant improvement of processor utilization and power consumption of systems employed in image analysis for optical pattern recognition and decoding in real scenes.

Examples of optical patterns include 1D barcodes, 2D barcodes, numbers, letters, and symbols. As scanning optical patterns is moved to mobile devices, there exists a need to increase scanning speed, increase accuracy, and/or manage processing power. Interpreting an optical pattern (e.g., scanning for an optical pattern) can be divided into two steps: detecting and decoding. In the detecting step, a position of an optical pattern within an image is identified and/or a boundary of the optical pattern is ascertained. In the decoding step, the optical pattern is decoded (e.g., to provide a numerical string, a letter string, or an alphanumerical string).

As optical patterns, such as barcodes and QR codes, are used in many areas (e.g., shipping, retail, warehousing, travel), there exists a need for quicker scanning of optical patterns. The following are techniques that can increase the speed and/or accuracy of scanning for optical patterns. The following techniques can be used individually, in combination with each other, or in combination with other techniques.

FIG. 1 depicts an example technique for automated recognition and decoding of a pattern in an image containing multiple patterns, in accordance with some embodiments. In FIG. 1, a system 100 having a display 110 presents a camera field of view (FOV) of a real scene containing multiple optical patterns 114. When a plurality of images are captured by a camera and presented in "real time" (e.g., presented on the display 110 in a sequential manner following capture, albeit potentially with some latency introduced by system processes), the display may include an image 112. As illustrated, the plurality of images depict a real world scene as viewed through a field of view (FOV) of the camera. The real world scene may include multiple objects 150, patterns, or other elements (e.g., faces, images, colors, etc.) of which the optical patterns 114 are only a part. For example, FIG. 1 depicts a first optical pattern 114-1, and a second optical pattern 114-2, among other optical patterns 114.

In some embodiments, an image 112 may be captured by a camera and/or provided via additional or alternative system processes (e.g., from a memory device, a communications connection to an online content network, etc.). The optical patterns 114 are detected and/or recognized in the image 112. In the context of this disclosure, detection and recognition of optical patterns may describe different approaches for image analysis of optical patterns. Detection may describe detecting an optical pattern in an image by characteristic discrete patterns (e.g., parallel bars or symbols). Recognition may include additional analysis of the pattern that provides descriptive and/or characteristic information (e.g., an optical pattern type) specific to the optical pattern, but does not necessarily include decoding the optical pattern. For example, a barcode may be detected in an image based on image analysis revealing a region of the image containing multiple parallel bars. After additional analysis, the barcode may be recognized as a UPC code. In some embodiments, detection and recognition are concurrent steps implemented by the same image analysis process, and as such are not distinguishable. In some embodiments, image analysis of optical patterns proceeds from detection to decoding, without recognition of the optical pattern. For example, in some embodiments, a similar approach can be used to detect a pattern of characters and in a second step decode the characters with optical character recognition (OCR).

Detecting optical patterns 114 permits automatic (e.g., without user interaction) generation and/or presentation on the display 110 of one or more graphical elements 122. In some embodiments, the graphical elements 122 may include, but are not limited to highlighted regions, boundary lines, bounding boxes, dynamic elements, or other graphical elements, overlaid on the image 112 to emphasize or otherwise indicate the positions of the optical patterns 114 in the plurality of images. Each optical pattern 114 may be presented with one or more graphical elements, such that the image 112 clearly shows the positions of the optical patterns 114 as well as other metadata, including but not limited to pattern category, decoding status, or information encoded by the optical patterns 114.

The system 100 may identify one or more of the optical patterns 114 for decoding. As mentioned above, the decoding may be automated, initializing upon detection an optical pattern 114 and successful implementation of a decoding routine. Subsequent to detection and/or decoding, object identifier information, optical pattern status, or other information to facilitate the processing of the optical patterns 114 may be included by a graphical element 122 associated with an optical pattern 114 that is decoded. For example, a first graphical element 122-1, associated with the first optical pattern 114-1, may be generated and/or presented via the display 110 at various stages of optical pattern detection and/or decoding. For example, after recognition, the first graphical element 122-1 may include information about the optical pattern template category or the number of patterns detected. Following decoding, the first graphical element 122-1 may present information specific to the first optical pattern 114-1. Where an optical pattern 114 is detected, but the decoding is unsuccessful, the system 100 may alter a graphical element 122 to indicate decoding failure, as well as other information indicative of a source of the error. As an illustrative example, a second graphical element 122-2 may indicate that the second optical pattern 144-2 cannot be decoded by the system 100, for example, through dynamic graphical elements or textual information. For example, the second graphical element 122-2 is a yellow box surrounding the second optical pattern 114-2 after the second optical pattern 114-2 is detected; the second graphical element 122-2 is changed to a red box if the second optical pattern 114-2 is not decoded, or is changed to a green box if the second optical pattern 114-2 is decoded.

As described in more detail in reference to FIGS. 3-11 below, various techniques may be implemented by the system 100 to improve decoding of the optical patterns 114. In some embodiments, the techniques may be initiated automatically or may be manually triggered. For example, the second graphical element 122-2 may indicate that the second optical pattern 114-2 is underexposed, and may trigger an exposure routine. Additionally or alternatively, the system may trigger an exposure routine in response to a user action associated with the second optical pattern 114-2, such as a screen tap on the display 110 in a region of the image 112 presenting the second optical pattern 114-2 or the second graphical element 122-2.

Figure 2:
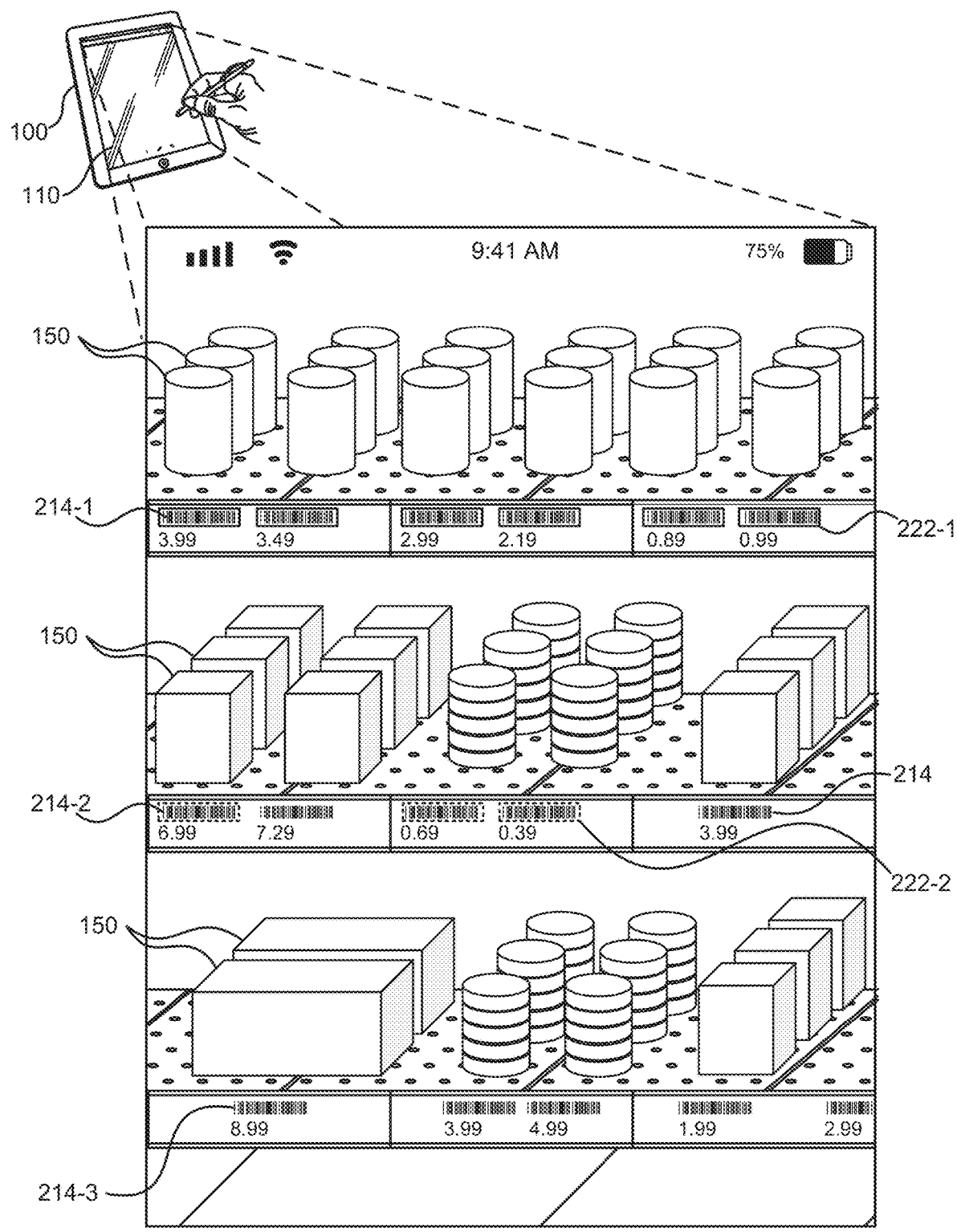
FIG. 2 depicts an example technique for automated recognition and decoding of a pattern in an image of a real scene containing multiple patterns, in accordance with some embodiments.

FIG. 2 depicts an example technique for automated recognition and decoding of a pattern in an image of a real scene containing multiple patterns, in accordance with some embodiments. The system 100 may include a camera that captures images of a real scene. As illustrated in FIG. 2, the real scene may include, but is not limited to a retail environment, a storage system, or other environment including multiple different types of objects 150 that are identifiable using information encoded in optical patterns 214. The real scene may include multiple optical patterns 214 at different positions in the real scene. Through the FOV of the camera, therefore, the ability of the system 100 to decode a first optical pattern 214-1 may differ from that for a second optical pattern 214-2, and from that for a third optical pattern 214-3, etc. As an illustrative example, environmental factors including, but not limited to, non-uniform lighting, different shelf depth, or position of an optical pattern 214 in the real scene, may affect the ability of the system 100 to decode the optical pattern.

For example, in an environment lit from above, the first optical pattern 214-1 may be more brightly lit than the third optical pattern 214-3, nearer the floor. In this way, differences in lighting may influence whether the third optical pattern 214-3 is sufficiently exposed in an image to allow the system 100 to decode it, where the image of the real scene is captured with exposure settings metered by the first optical pattern 214-1. Similarly, the image of the real scene may include some optical patterns 214 in the foreground and other optical patterns 214 in the background, as when the system 100 is held by a user of the system 100 nearer the first optical pattern 214-1 than the third optical pattern 214-3 (e.g., at eye level). When the system 100 implements autofocus routines, the image of the real scene may therefore include the first optical pattern 214-1 in focus, and may include the second optical pattern 214-2 and/or the third optical pattern 214-3 out of focus, for example, as a result of the camera having a relatively narrow depth of field.

In some embodiments, graphical elements 222 are presented on the display 110 (e.g., as an overlay to image 112 in FIG. 1) to indicate an optical pattern 214 that has been detected, recognized, or decoded. Additionally or alternatively, the graphical elements 222 may include metadata including, but not limited to, a notification of decoding failure, whether the optical pattern has been detected or decoded, or a visual indication of object identifier information encoded by the respective optical pattern 214. For example, in an environment where the first optical pattern 214-1 is in focus, an optical pattern 214 at the same distance from the system 100 as the first optical pattern 214-1 may be detected and decoded, and may be overlaid by a first graphical element 222-1 that indicates the optical pattern 214 has been decoded (e.g., a solid line boundary, a highlighted region, etc.). In contrast, where the second optical pattern 214-2, and other optical patterns at the same or similar distance from the system 100, is out of focus, a second graphical element 222-2 may be presented on the display to indicate that the optical patterns 214 at that position are detected, but cannot be decoded (e.g., a dashed, red boundary). Where the third optical pattern 214-3 is further out of focus, such that the third optical pattern 214-3 and other optical patterns 214 at a similar position are not detected, the system 100 may leave the image of the real scene as it is without generating or presenting a graphical element 222 via the display 110 overlying the third optical patterns 214-3 at the third position (e.g., the third optical pattern 214-3 is not detected by the system 100 because the third optical pattern 214-3 is too out of focus, and/or the exposure of the image is too dark at the third optical pattern 214-3, for the system to distinguish that the third optical pattern 214-3 is a barcode).

As described in reference to the forthcoming paragraphs, various other techniques may be implemented, individually or in combination, to improve the performance of the system 100 in detecting, recognizing, and decoding the optical patterns 214. These techniques include, but are not limited to, exposure control techniques, focus control techniques, zoom control techniques, image analysis techniques, resolution control techniques, or multi-threading techniques. Implementing these techniques may improve the operation of the system 100 for decoding optical patterns 214 in real scenes including multiple optical patterns under different conditions, for example, by improving speed of operation, reducing redundant imaging routines, targeting optical patterns in images of the real scenes, and may also reduce the computational demands of the system 100 by controlling system operation at the micro-processor level.

A. Exposure Algorithm

Figure 3:
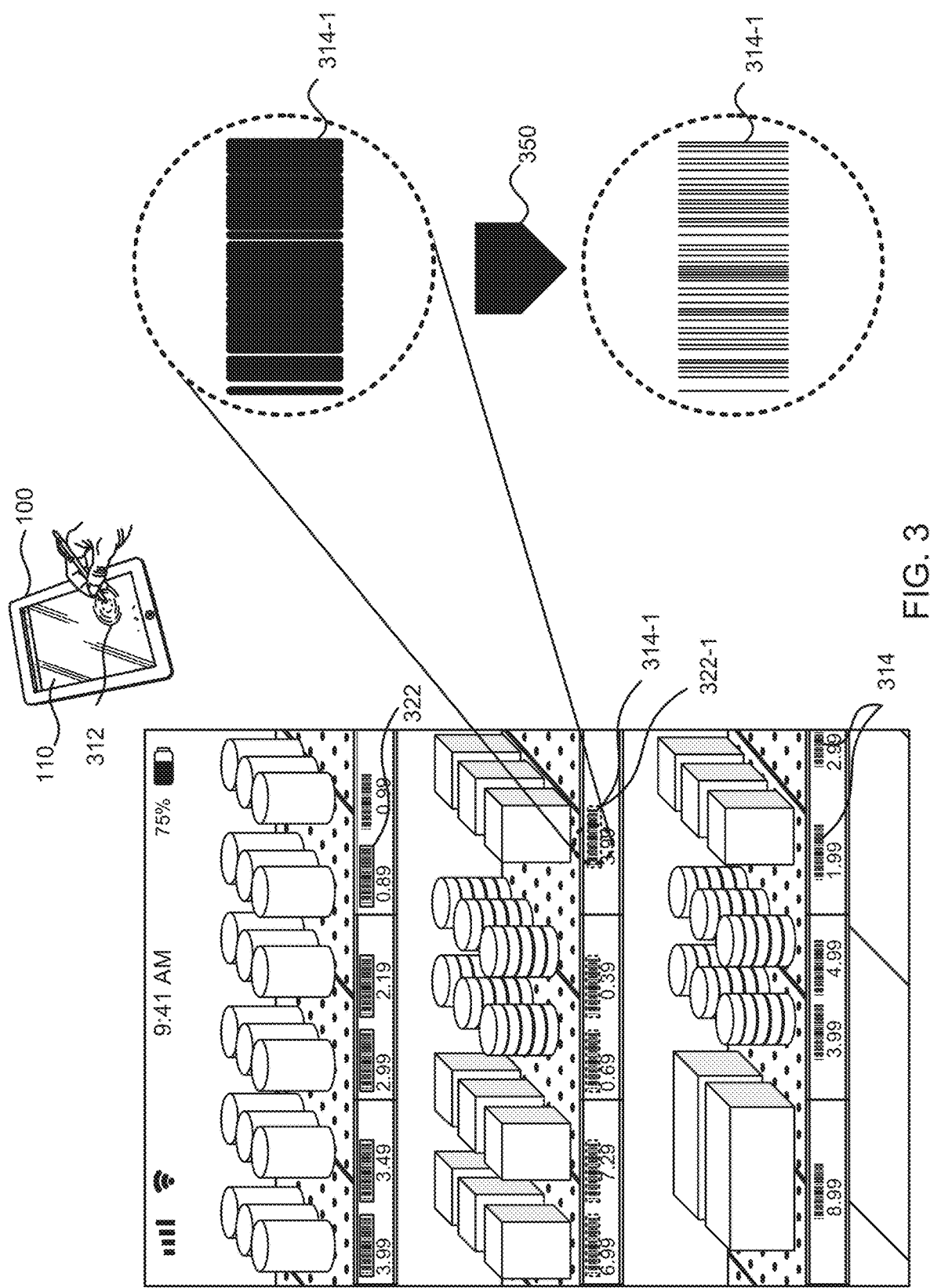
FIG. 3 depicts an example technique for exposure control to facilitate decoding of a pattern in an image of a real scene, in accordance with some embodiments.

FIG. 3 depicts an example technique for exposure control to facilitate decoding of a pattern in an image of a real scene, in accordance with some embodiments. In the illustrative example of the real scene as a shelving environment lit from above, the system 100 may initially meter the exposure of the camera based on a relatively bright region of the image. For example, typical auto exposure ("AE") algorithms balance ISO/gain with exposure times to get visually pleasing images/video. While such approaches are developed for imaging, exposure and ISO/gain balance is not always optimal for detecting or decoding optical patterns 314 in the image of the real scene. For a system that implements a typical AE algorithm, some optical patterns 314 may be overexposed, while other optical patterns 314 may be underexposed. For example a first optical pattern 314-1 may be underexposed or overexposed when the system 100 implements an AE algorithm, where the system 100 is able to detect the first optical pattern 314-1, but is unable to decode the first optical pattern 314-1. As illustrated in FIG. 3, the first optical pattern 314-1 is a barcode constructed primarily of parallel vertical bars, and while it is visible in the image presented on the display 110, the individual vertical bars are not distinguishable as a result of underexposure or overexposure.

Multiple approaches to exposure compensation or improvement may be implemented by the system 100 to improve the performance of the system 100 for optical pattern detection and decoding. In some embodiments, the system 100 may present graphical elements 322 to indicate, among other information, whether the images are sufficiently exposed, by overlaying the graphical elements 322 on the optical patterns 314 and differentiating between optical patterns that are successfully decoded and those that are detected, but underexposed or overexposed. For example, a first graphical element 322-1 may be presented overlaid on the first optical pattern 314-1, indicating that it is underexposed.

In some embodiments, a user of the system 100 may interact with the system 100 and/or the display 110 of the system, for example, by a user action 312 in a region of the display 110 corresponding to the position of the first optical pattern 314-1. The user action 312 may include, but is not limited to, a screen tap on the display, a voice command, or an interaction through peripheral devices. In response, the system 100 may disable a part or all of the default AE algorithm and may modify one or more parameters of the camera to meter on the first optical pattern 314-1. For example, where the first graphical element 322-1 indicates that the first optical pattern 314-1 is underexposed or overexposed, the user action 312 on the first graphical element 322-1 may be linked to triggering the exposure control. Accordingly, the system 100 may adjust camera parameters and capture another image (operation 350) that the system 100 is able to decode the first optical pattern 314-1 in. The system 100 may also present user controls for enabling an automatic exposure control algorithm to replace the default AE algorithm, as described in more detail in reference to FIG. 4. In this way, the user action 312 may also include interacting with a menu or a control sequence that may initiate the automatic exposure control algorithm.

Figure 4:
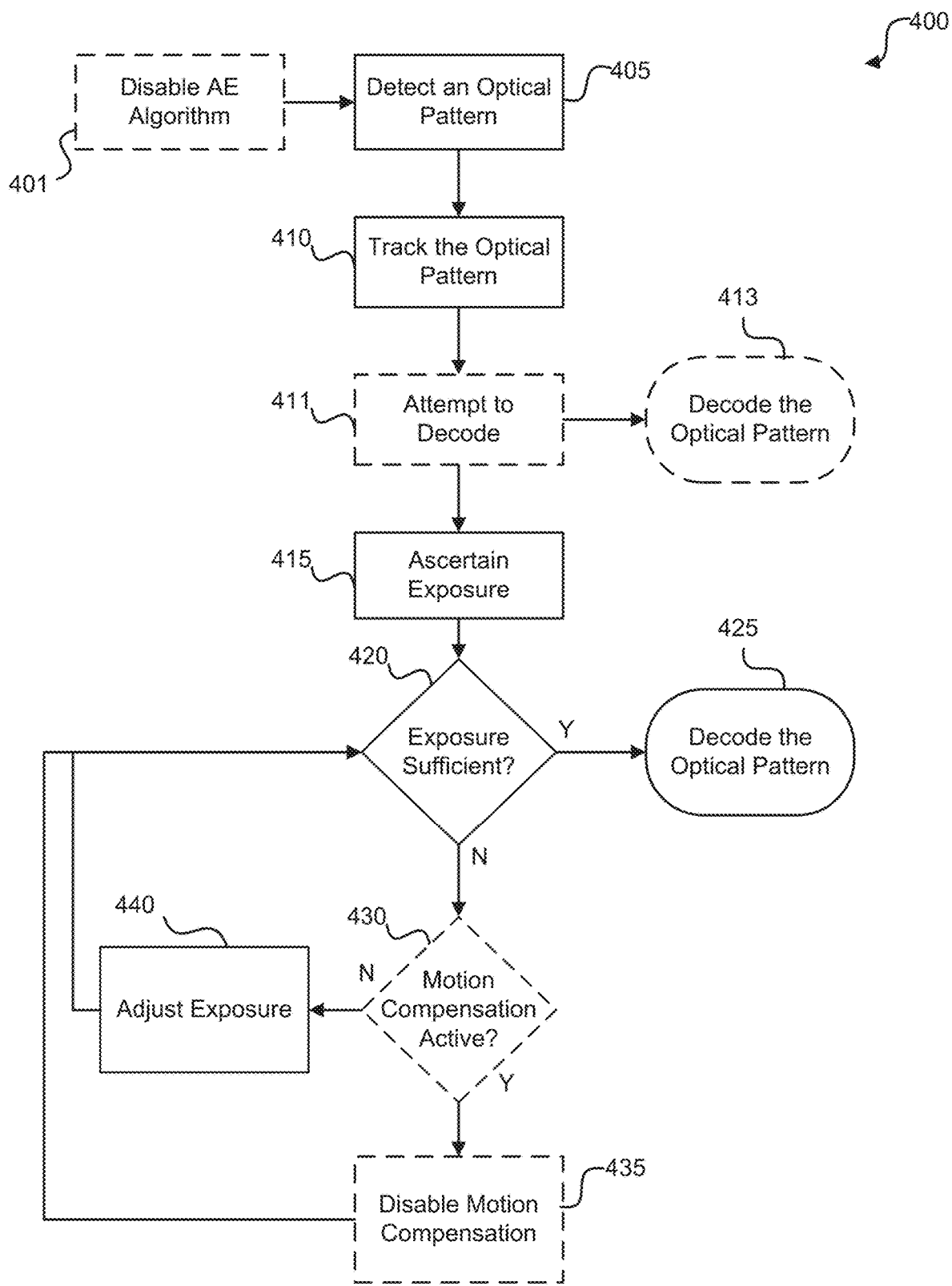
FIG. 4 depicts an example block flow diagram describing an automatic exposure control algorithm, in accordance with some embodiments.

FIG. 4 depicts an example block flow diagram describing an automatic exposure control algorithm 400, in accordance with some embodiments. In some embodiments, the system 100 may implement the automatic exposure control algorithm 400 by default, or it may be initiated when optical patterns are detected, but cannot be decoded due to being overexposed or underexposed. The automatic exposure control algorithm 400 may include, at operation 401, disabling an AE algorithm of the system 100 that may be provided as a default feature of the system 100. To manage the operation of the camera with respect to metering exposure of images captured by the camera, disabling the default AE algorithm may include, but is not limited to, implementing processor operations on a hardware or an application layer of the system 100, for example, such that the automatic exposure control algorithm 400 replaces the AE algorithm while the system 100 is capturing images for detection and decoding of optical patterns (e.g., optical patterns 314 of FIG. 3). In this way, the camera may be controlled directly by software implemented by the system that may temporarily replace the AE algorithm while the software is operating.

In some embodiments, the system detects an optical pattern at operation 405. As described in more detail in reference to FIGS. 1-2, the real scene may include multiple optical patterns (e.g., optical patterns 114 of FIG. 1) for detection and/or decoding. The system may, therefore, implement operation 405 for a given optical pattern in the real scene, but may also detect multiple optical patterns. In this way, while the operations of the automatic exposure control algorithm 400 are illustrated as being performed in a sequence, one or more of the constituent operations may be executed in parallel, as an approach to improve performance. For example, parallelizing detection in operation 405 may reduce overall latency of the detection and decoding process.

After detection of the optical pattern at operation 405, the system may track the optical pattern at operation 410. Tracking the optical pattern may include image processing techniques such as edge detection, keypoint detection, or other techniques enabling the system to distinguish an optical pattern that encodes information from other patterns appearing in the real scene, such as decorations or other periodic features. Tracking the optical pattern further enables the system to particularize optical patterns appearing in the real scene, and enables the system to implement additional operations, such as inventory management or scene change detection.

In some embodiments, the system may attempt to decode the optical patterns at operation 411. This approach may improve overall system performance by reducing additional operations of the automatic exposure control algorithm 400, in cases where the system is able to decode an optical pattern in the image already taken. For example, the system may be able to decode the optical pattern directly, at operation 413, in which case the subsequent operations are not pursued. In some embodiments, the system proceeds with the subsequent operations for those optical patterns that cannot be decoded as well as decoding the optical patterns at operation 413 that the system is able to decode.

For the detected optical patterns, the system may ascertain the exposure level(s) of the optical patterns at operation 415. For embodiments including the optional operation 411, the system may implement the operation 415 to ascertain whether the optical pattern is underexposed or overexposed. Ascertaining the exposure level may include various approaches, such as ascertaining a resolution of the optical pattern, ascertaining a contrast between light and dark portions of the optical pattern, ascertaining a sharpness of the constituent elements of the optical pattern, or ascertaining an intensity distribution of the optical pattern. For example, in an illustrative example of a barcode (e.g., first optical pattern 314-1 of FIG. 1), a region of an image of the real scene including the barcode may be processed by the system, such that the color map of each pixel or a grouping of pixels is described. In this way, the system may ascertain whether individual bars are distinguishable and the image can be used to decode the code. As such, the system may evaluate whether the image is sufficiently exposed to decode the optical pattern at operation 420. The system may execute the operation 420 by comparing an output of the image analysis of the operation 415 against a threshold value. In some embodiments, the threshold value may be pre-defined. For example, the system may be able to detect an optical pattern, and may recognize the optical pattern as a UPC barcode, for which a threshold exposure level may be predefined, as in a lookup table or other dataset. In some embodiments, the system may proceed to decode optical patterns for which the exposure is sufficient at operation 425, for example, where the system has not already attempted to decode the optical patterns at operation 411 or where some of the optical patterns have been decoded, but others have not.

Image processing techniques that are applied to improve aesthetic aspects of images may interfere with optical pattern decoding. Some mobile electronic devices that incorporate cameras employ motion compensation algorithms, serving to reduce image artifacts by smoothing or blurring slight motion in an image. For example, a motion compensation feature may correct ghost images introduced by motion of the mobile electronic device by filtering or smoothing the image, which may negatively affect the exposure of the optical pattern detected at the operation 405. The motion compensation may be an automatically enabled feature in medium or low-light conditions, and may interfere with decoding optical patterns. In this way, the system may check for a motion compensation feature at operation 430, and may disable the motion compensation feature and reacquire an image at operation 435.

In some cases, as when the optical pattern is overexposed or underexposed in the image of the real scene, the system may modify one or more parameters of the camera at operation 440 to adjust the exposure of the optical pattern and acquire a new image at the new exposure. The operation 440 may include, but is not limited to, adjusting camera parameters to generate an image with reduced motion blur and higher contrast in the region of the image containing the optical pattern. The balance of motion blur and contrast may inform the approach to modifying camera parameters. For example, a higher gain (e.g., film speed/ISO value) is preferred over a longer exposure time. In some embodiments, exposure is stopped down as preferable to increasing exposure time. For example, many cameras set an exposure for 18% gray as a default value. The system may reset the exposure for the camera at 1, 2, 3, 5, or more stops below exposure for 18% gray. In some embodiments, exposure time cannot be slower than the frame rate, or half the frame rate, of the camera. In some embodiments, a user interface or an application program interface provides a motion compensation option, which, when selected, limits shutter speed of the camera to be no slower than $\frac{1}{30}$, $\frac{1}{60}$, $\frac{1}{125}$, or $\frac{1}{250}$ of a second. In some embodiments, if maximum gain is set, then exposure time can be increased.

Figure 5:
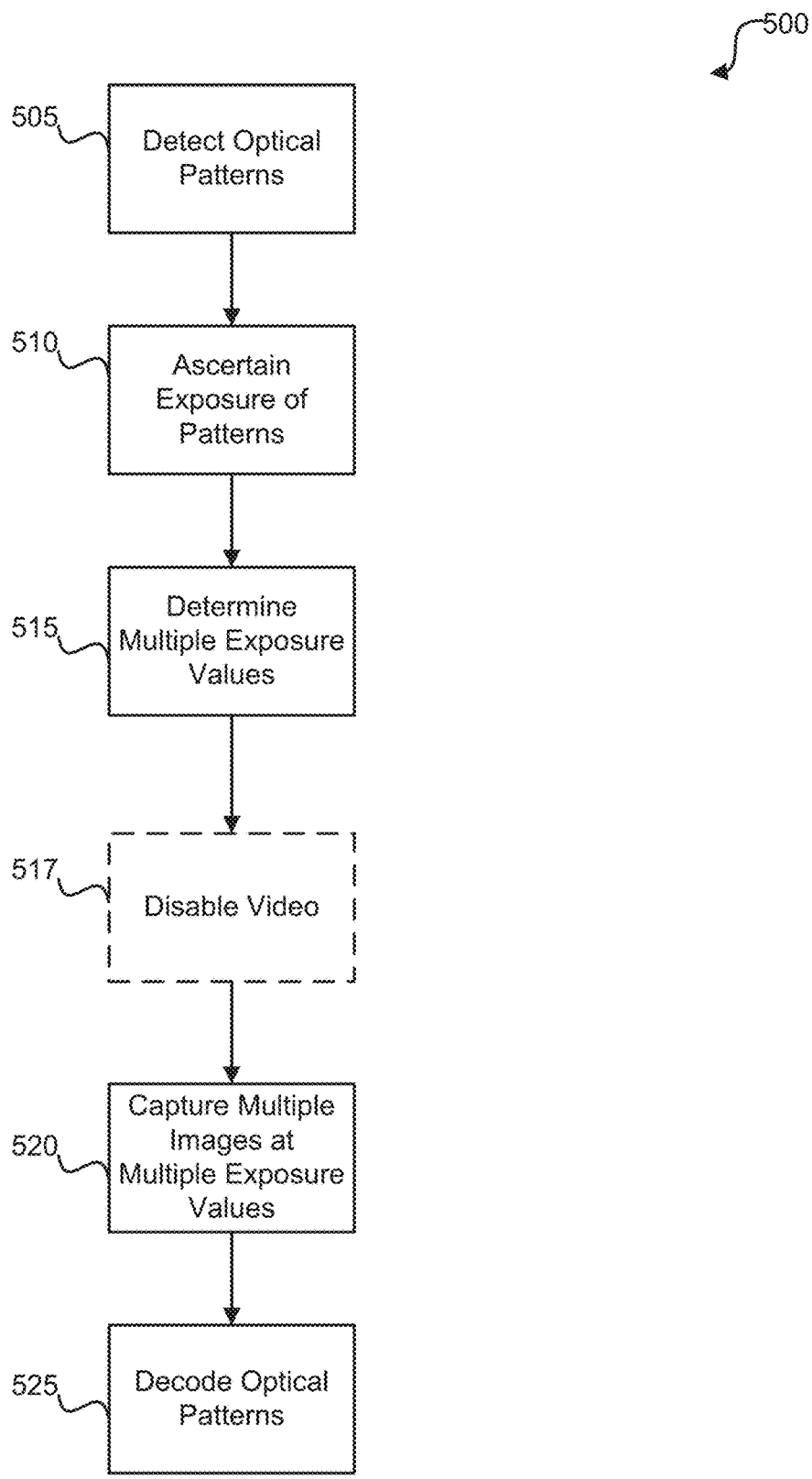
FIG. 5 depicts an example block flow diagram describing implementing a multiple-exposure algorithm, in accordance with some embodiments.

FIG. 5 depicts an example block flow diagram describing implementing a multiple-exposure algorithm, in accordance with some embodiments. As described in more detail in reference to FIG. 2, above, an image of a real scene may include multiple optical patterns at different exposure levels, such that some optical patterns are either overexposed or underexposed. To that end, the system executing the multiple exposure algorithm 500 may detect the optical patterns at operation 505. Detecting the optical patterns may include the image processing techniques described above in reference to the operation 405 of FIG. 4. Once detected, the system may ascertain the exposure level(s) of the optical patterns at operation 510. As with the techniques described in reference to FIG. 4, the system may optionally attempt to decode all detected optical patterns directly, rather than executing the operation 510, which may reduce the number of instances of the operation 510 that are implemented by the system. From the exposure values of the optical patterns, the system may determine multiple exposure values, and corresponding camera parameters, at which the optical patterns detected at the operation 505 may be successfully decoded, at operation 515. In the illustrative example of FIGS. 2-3, if the camera is metered at the light level of the top shelf in the real scene, optical patterns on the middle or bottom shelves may be underexposed. In this way the operation 515 may include determining one or more modified exposure levels for the codes on the middle shelf and/or on the bottom shelf.

In some embodiments, the system switches from a live image or video mode to a still image mode at operation 517. Where live images permit dynamics in the real scene to be captured in real time, and may reduce latency and improve speed in decoding individual optical patterns or multiple optical patterns in sequence, the system may capture an entire real scene and decode multiple optical patterns from a single position by capturing multiple still images at different exposure levels. In the example of the retail shelf, multiple still images may be acquired by the system at operation 520, for which the camera parameters are modified to capture the optical patterns on the top shelf, the middle shelf, and the bottom shelf at a sufficient exposure (e.g., operation 350 of FIG. 3).

In some embodiments, the operation 520 includes capturing images at full resolution, as opposed to the typically reduced resolution that is applied for video frames. Full-resolution still images (e.g., RAW-format images) may provide an additional advantage of higher bit depth than video frames. Bit depth refers to the number of bits used to indicate the color of a single pixel, in a bitmapped image or video framebuffer, or the number of bits used for each color component of a single pixel. Higher bit depth may permit the system to apply image processing techniques to the images to distinguish between constituent elements of an optical pattern. For example, in a barcode constructed of parallel bars, an image with higher bit depth may provide more precise color data and, as such, may permit more accurate decoding of optical patterns.

After capturing the multiple images at the multiple exposure values, the system may decode the optical patterns at operation 525. In some embodiments, the system may correlate the optical patterns in each of the multiple images to the exposure level determined for each optical pattern at the operation 510. In this way, the system may attempt to decode only the optical patterns appearing in the appropriate images, which may improve system performance by reducing the overall number of decoding operations. Alternatively, the system may generate a composite image including the optical patterns and decode the optical patterns appearing in the composite image.

In some embodiments, a mobile device is used for decoding an optical pattern in a real scene. A mobile device may include a camera, one or more processors in communication with the camera, and one or more memory devices storing instructions. The instructions, when executed by the one or more processors, may cause the mobile device to disable an automatic exposure feature controlling one or more parameters of the camera. The instructions, when executed by the one or more processors, may cause the mobile device to acquire a first image of a scene using the camera. The instructions, when executed by the one or more processors, may cause the mobile device to detect an optical pattern in the first image, the optical pattern encoding an object identifier. The instructions, when executed by the one or more processors, may cause the mobile device to ascertain an exposure of the optical pattern in the first image. The instructions, when executed by the one or more processors, may cause the mobile device to modify at least one parameter of the camera based on the exposure of the optical pattern. The instructions, when executed by the one or more processors, may cause the mobile device to acquire a second image using the modified parameter. The instructions, when executed by the one or more processors, may also cause the mobile device to decode the optical pattern in the second image, generating the object identifier.

In some embodiments, ascertaining the exposure of the optical pattern includes ascertaining that the optical pattern is overexposed or underexposed and ascertaining that the one or more processors cannot decode the optical pattern in the first image based on the optical pattern being overexposed or underexposed. Ascertaining the exposure of the optical pattern may include ascertaining that the optical pattern is unresolved or blurred and ascertaining that the one or more processors cannot decode the optical pattern in the first image based on the optical pattern being unresolved or blurred. Modifying at least one parameter of the camera may include determining an exposure level of the optical pattern using the first image and modifying at least one parameter of the camera providing the exposure level of the optical pattern, increasing a brightness, a sharpness, or a contrast of the optical pattern in the second image. The at least one parameter of the camera may be or include a gain, a frame rate, an exposure time, or an aperture. Modifying the at least one parameter of the camera may include increasing or decreasing the exposure time of the camera. The instructions, when executed, may further cause the one or more processors to receive a user action comprising an interaction with a display of the mobile device, before disabling the automatic exposure system. The optical pattern may be a first optical pattern, the exposure may be a first exposure, and the modified parameter may be a first modified parameter. The instructions, when executed, may further cause the one or more processors to detect a second optical pattern in the first image. The instructions, when executed, may further cause the one or more processors to ascertain a second exposure of the second optical pattern in the first image. The instructions, when executed, may further cause the one or more processors to modify at least one of the one or more parameters of the camera using the second exposure of the second optical pattern. The instructions, when executed, may further cause the one or more processors to acquire a third image using the at least one modified parameter. The instructions, when executed, may also further cause the one or more processors to decode the second optical pattern in the third image. The instructions, when executed, may further cause the one or more processors to detect a plurality of optical patterns in the first image. The instructions, when executed, may further cause the one or more processors to determine a plurality of exposure values based on the plurality of optical patterns in the first image. The instructions, when executed, may further cause the one or more processors to acquire a plurality of images, each image of the plurality of images acquired according to one or parameters of the camera determined using an exposure value of the plurality of the exposure values. The instructions, when executed, may also further cause the one or more processors to decode the plurality of optical patterns in the plurality of images. The instructions, when executed, may further cause the one or more processors to disable the automatic exposure feature controlling one or more parameters of the camera before acquiring the first image of the scene using the camera. The instructions, when executed, may further cause the one or more processors to track the optical pattern in a plurality of images before acquiring the first image of the scene using the camera.

In some embodiments, a mobile device is used for decoding an optical pattern in a real scene. A mobile device may include a camera, one or more processors in communication with the camera, and one or more memory devices storing instructions. The instructions, when executed by the one or more processors, may cause the mobile device to disable an automatic exposure feature controlling one or more parameters of the camera. The instructions, when executed by the one or more processors, may cause the mobile device to acquire a first image of a scene using the camera. The instructions, when executed by the one or more processors, may cause the mobile device to detect an optical pattern in the first image, the optical pattern encoding an object identifier. The instructions, when executed by the one or more processors, may cause the mobile device to ascertain an exposure of the optical pattern in the first image. The instructions, when executed by the one or more processors, may cause the mobile device to modify at least one parameter of the camera based on the exposure of the optical pattern. The instructions, when executed by the one or more processors, may cause the mobile device to acquire a second image using the modified parameter. The instructions, when executed by the one or more processors, may also cause the mobile device to decode the optical pattern in the second image, generating the object identifier.

In some embodiments, ascertaining the exposure of the optical pattern includes ascertaining that the optical pattern is overexposed or underexposed and ascertaining that the one or more processors cannot decode the optical pattern in the first image based on the optical pattern being overexposed or underexposed. Ascertaining the exposure of the optical pattern may include ascertaining that the optical pattern is unresolved or blurred and ascertaining that the one or more processors cannot decode the optical pattern in the first image based on the optical pattern being unresolved or blurred. Modifying at least one parameter of the camera may include determining an exposure level of the optical pattern using the first image and modifying at least one parameter of the camera providing the exposure level of the optical pattern, increasing a brightness, a sharpness, or a contrast of the optical pattern in the second image. The at least one parameter of the camera may be or include a gain, a frame rate, an exposure time, or an aperture. Modifying the at least one parameter of the camera may include increasing or decreasing the exposure time of the camera. The instructions, when executed, may further cause the one or more processors to receive a user action comprising an interaction with a display of the mobile device, before disabling the automatic exposure system. The optical pattern may be a first optical pattern, the exposure may be a first exposure, and the modified parameter may be a first modified parameter. The instructions, when executed, may further cause the one or more processors to detect a second optical pattern in the first image. The instructions, when executed, may further cause the one or more processors to ascertain a second exposure of the second optical pattern in the first image. The instructions, when executed, may further cause the one or more processors to modify at least one of the one or more parameters of the camera using the second exposure of the second optical pattern. The instructions, when executed, may further cause the one or more processors to acquire a third image using the at least one modified parameter. The instructions, when executed, may also further cause the one or more processors to decode the second optical pattern in the third image. The instructions, when executed, may further cause the one or more processors to detect a plurality of optical patterns in the first image. The instructions, when executed, may further cause the one or more processors to determine a plurality of exposure values based on the plurality of optical patterns in the first image. The instructions, when executed, may further cause the one or more processors to acquire a plurality of images, each image of the plurality of images acquired according to one or parameters of the camera determined using an exposure value of the plurality of the exposure values. The instructions, when executed, may also further cause the one or more processors to decode the plurality of optical patterns in the plurality of images. The instructions, when executed, may further cause the one or more processors to disable the automatic exposure feature controlling one or more parameters of the camera before acquiring the first image of the scene using the camera. The instructions, when executed, may further cause the one or more processors to track the optical pattern in a plurality of images before acquiring the first image of the scene using the camera.

B. Tap to Zoom

Figure 6:
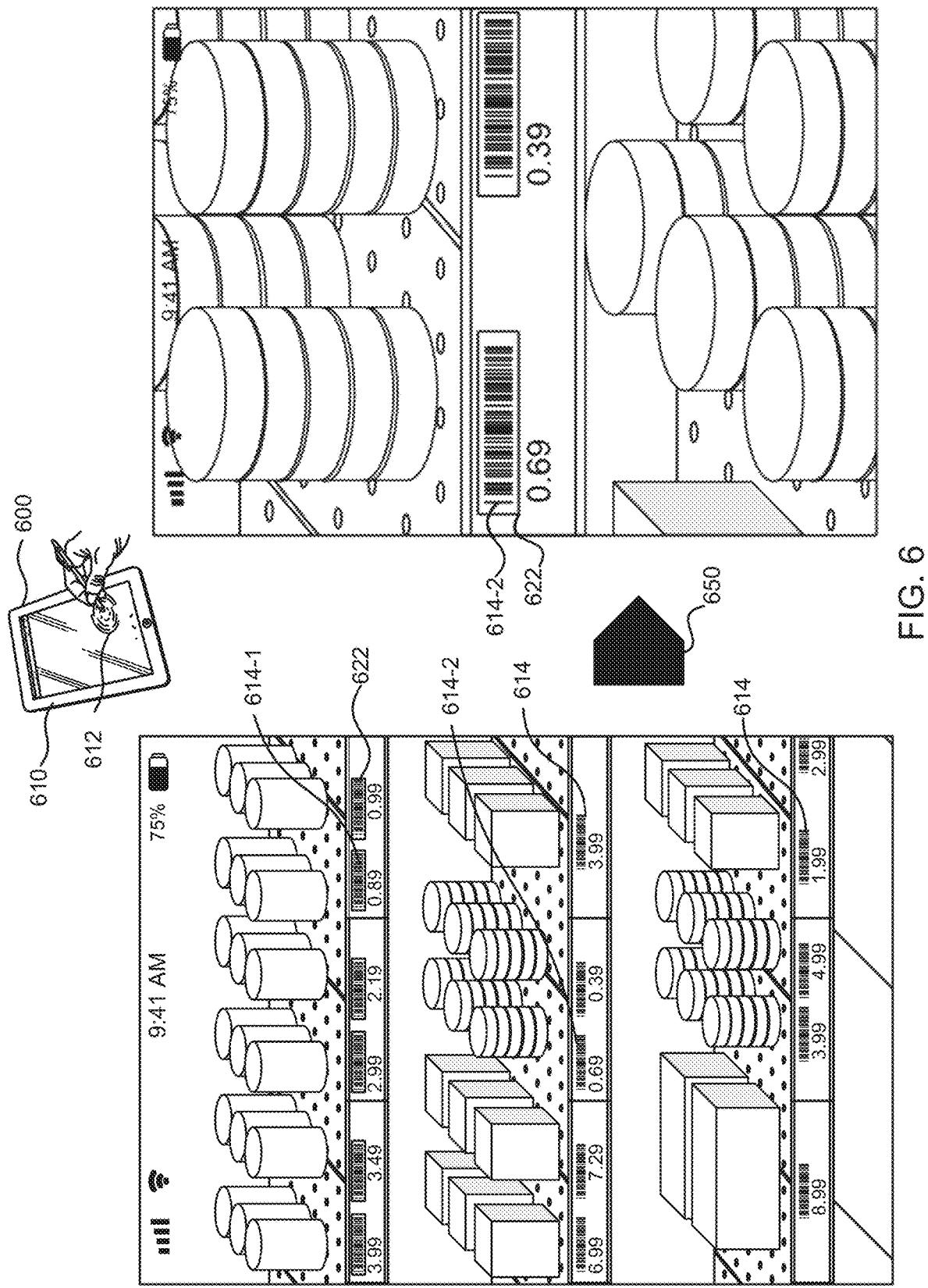
FIG. 6 depicts an example technique for zoom control to facilitate decoding of a pattern in an image of a real scene, in accordance with some embodiments.

FIG. 6 depicts an example technique for zoom control to facilitate decoding of a pattern in an image of a real scene, in accordance with some embodiments. In some embodiments, zoom (mechanical and/or digital) can be used to assist in decoding an optical pattern. Using a zoom feature of a camera can help in various situations, such as helping a user avoid bending over to scan a barcode. For example, an employee at a grocery store uses a mobile device to scan barcodes on store shelves. The mobile device can detect and decode barcodes on shelves that are waist high to the employee. However, for barcodes on shelves near the employee's feet and knees, or above the employee's head, the mobile device might not be able to decode those barcodes because of lack of resolution or because the barcodes are too small in the images used to detect and decode. Accordingly, a camera on the mobile device could be used to zoom to a barcode.

As illustrated in FIG. 6, multiple optical patterns 614 may be included in the image of the real scene. In some embodiments, the image of the real scene may be captured by a camera incorporated into a mobile electronic device that is positioned nearer to a first optical pattern 614-1 than a second optical pattern 614-2. In this way, the first optical pattern 614-1 may be of sufficient size to be successfully decoded by the system 600, while the second optical pattern 614-2 may be too small to be successfully decoded, based, for example, on the resolution, bit-depth, or other parameter of the image of the real scene.

As described in more detail in reference to FIGS. 1-2, the system 600 may generate and/or present graphical elements 622 overlaid on the image of the real scene at positions corresponding to the optical patterns 614. The graphical elements 622 may indicate that the optical patterns are detected, recognized, decoded, or may present other information, such as whether an image limitation is preventing the respective optical pattern 614 from being decoded (e.g., exposure, focus, size, etc.). The indication provided by the graphical elements 622 may permit a user of the system 600 to identify those optical patterns 614 appearing in the image that the system is unable to detect and/or decode. In this way, the system 600 may receive a user action 612, such as a screen tap in the region of an optical pattern 614, which may cause the system to adjust a magnification of the camera (operation 650) to generate a magnified image localized on a region of the image corresponding to the user action 612. For example, the user of the system 600 may wish to decode the second optical pattern 614-2, when the second optical pattern 614-2 is too small in a first image. The user of the system 600 may tap the display 610 of the system 600 to cause the system to capture a second image at a higher magnification, such that the second optical pattern is captured with sufficient size to be decoded. Additionally or alternatively, the system 600 may automatically modify the magnification setting and capture images at increased magnification for optical patterns that have been detected, but are too small to be decoded, as described in more detail in reference to FIGS. 7-8, below.

Figure 7:
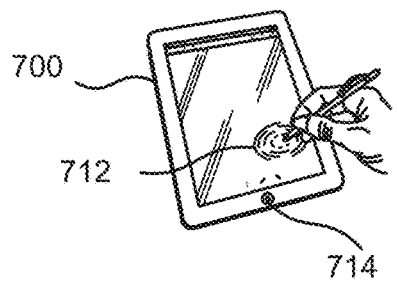
FIG. 7 depicts an block flow diagram for manual zoom control to facilitate decoding of a pattern in an image of a real scene, in accordance with some embodiments.
Figure 7:
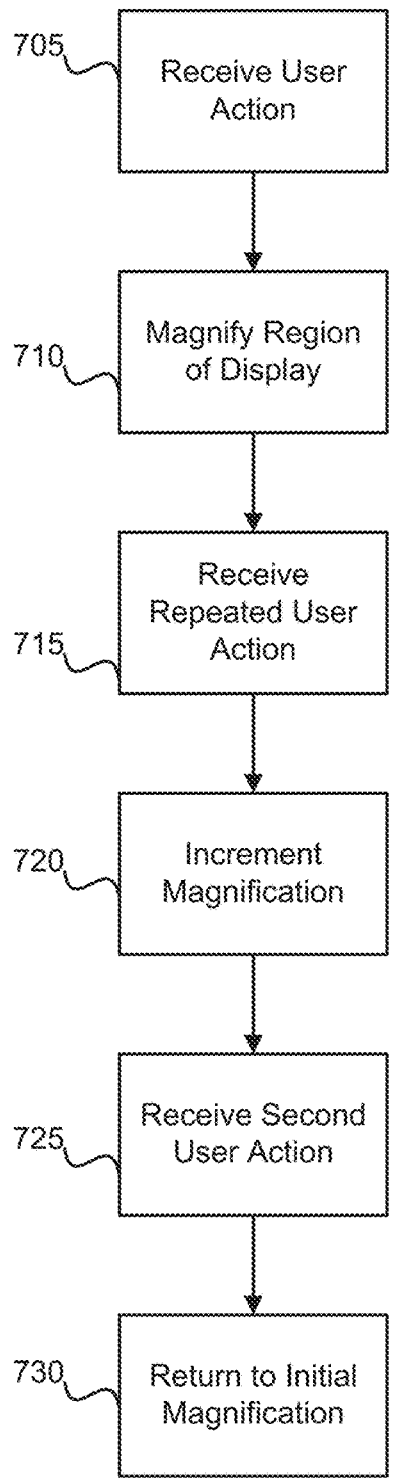
Figure 7:
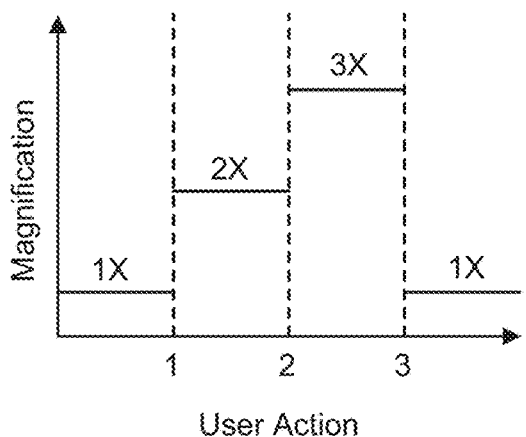

FIG. 7 depicts a block-flow diagram for manual zoom control to facilitate decoding of a pattern in an image of a real scene, in accordance with some embodiments. As described in reference to FIG. 6, manual zoom control may be implemented to improve performance of optical pattern detection and decoding in images containing multiple optical patterns, where an optical pattern is included in an image of a real scene, but is too small to be detected and/or decoded. A system 700 may receive a user action 712 at operation 705. The user action 712 may include a screen tap on a display of the system 700, or other forms of user interaction, including through peripherals or voice interaction. In response to receiving the user action 712, the system 700 may increase the magnification of a camera of the system 700, and may generate an image of the region corresponding to an optical pattern that was previously too small to be decoded, at operation 715. In some cases, the user action 712 indicates the region to be magnified, but the system 700 may also identify a region including multiple optical patterns that are each too small to be decoded, and may magnify that region in a zoomed image.

The zoom of the camera can be set to a predetermined zoom factor. For example, in response to receiving the user action 712, the system 700 may increase the magnification by a fixed magnification factor (e.g., 1.5, 2, or 3). In some embodiments, the magnification factor is equal to or greater than 1.5 and/or equal to or less than 3. In this way, the system may respond to repeated user actions 712 by incrementing the magnification and capturing an image at operation 720. In some embodiments, the user of the system 100 may provide a second user action 714, received by the system 700 at operation 725. The second user action may be the same as the user action 712, for example, as a repetition of the user action 712 or two instances of the user action 712 in short succession, such that the system 700 recognizes the combination of actions as the second user action 714.

As illustrated in FIG. 7, the system 700 may increment the magnification by a fixed increment for each successive user action 712. The fixed increment may be at least 0.1×, at least 0.2×, at least 0.3×, at least 0.4×, at least 0.5×, at least 0.6×, at least 0.7×, at least 0.8×, at least 0.9×, at least 1.0×, at least 1.5×, or more. After a first instance of the user action 712, the system may increase the magnification by a factor of 2, and after a second instance of the user action 712, the system 700 may increase the magnification by a factor of 1.5. After receiving the second user action, the system 700 may return the camera to the initial magnification at operation 730. In some embodiments, the system implements a binary quantized zoom. For example, only two levels: 1. "out" and 2. "in" are used, where level 2 is the magnification factor times level 1, and/or level 1 is the widest angle of the camera (however, level 1 "out" could be set to not be the widest angle of the camera based on a specific scanning application).

Figure 8:
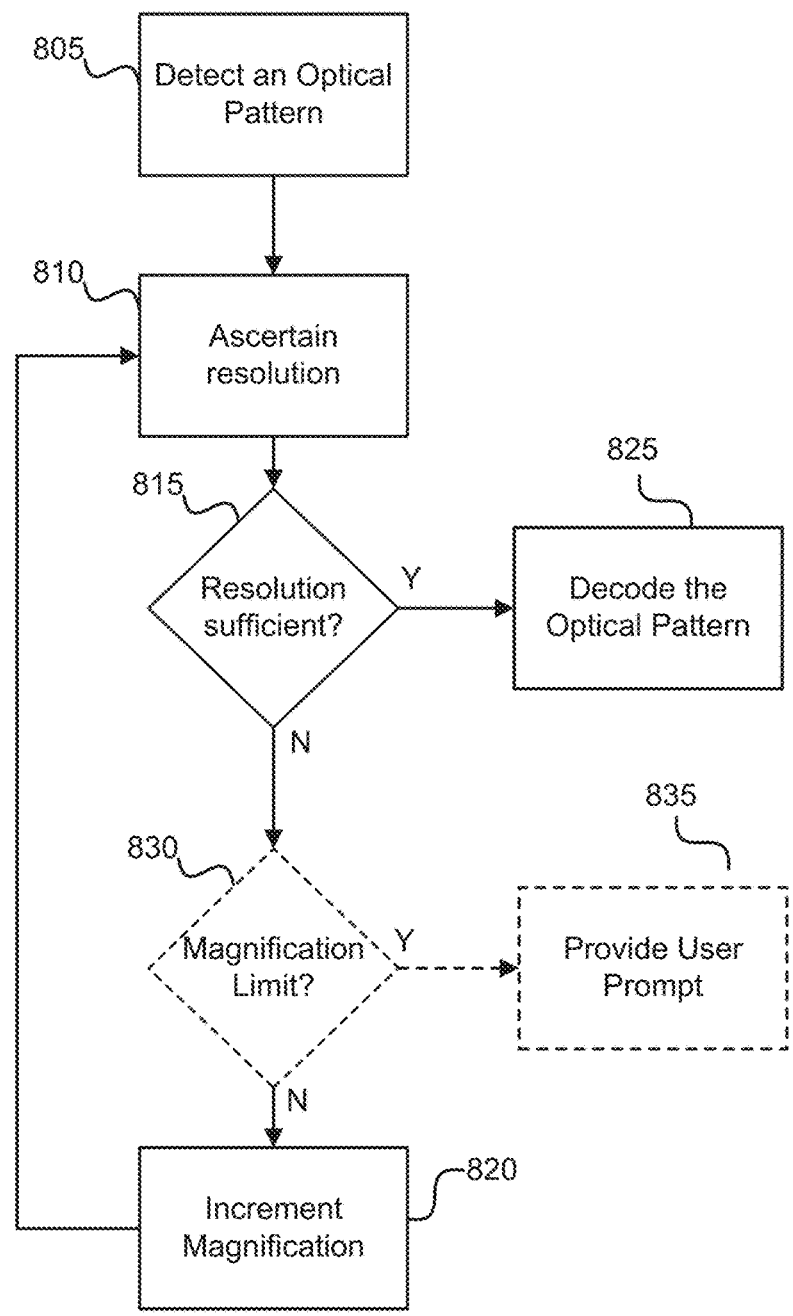
FIG. 8 depicts an example block flow diagram describing automatic zoom control to facilitate decoding of a pattern in an image of a real scene, in accordance with some embodiments.

FIG. 8 depicts an example block flow diagram describing automatic zoom control to facilitate decoding of a pattern in an image of a real scene, in accordance with some embodiments. As opposed to receiving a user action to trigger magnification, automatic zoom control may improve detection and decoding of optical patterns in real scenes that include multiple optical patterns, for example, by identifying optical patents that are detected, but are too small to be decoded. As described in reference to FIGS. 6-7, a system may modify the magnification of a camera between two fixed magnifications, for example by applying a magnification factor, and may capture a zoomed image. In some embodiments, the system may apply a magnification to the camera after waiting for a period of time after ascertaining that the optical pattern is too small to be decoded. The period of time may be at least 0.1 sec, at least 0.2 sec, at least 0.3 sec, at least 0.4 sec, at least 0.5 sec, at least 0.6 sec, at least 0.7 sec, at least 0.8 sec, at least 0.9 sec, at least 1.0 sec, at least 1.5 sec, at least 2.0 sec, at least 2.5 sec, at least 3.0 sec, or longer. In some embodiments, the system may return the camera to an initial magnification after an optical pattern in a magnified region of an image of the real scene is decoded. Automated zoom features may be accompanied by visual indications and prompts, presented via a display or with speakers, to guide the user of the system.

As an illustrative example of automatic zoom implementation, a mobile device detects a barcode at operation 805, and ascertains the resolution of the barcode at operation 810. Where the mobile device ascertains that the resolution is not sufficient to decode the barcode at operation 815, the mobile device implements a zoom at operation 820, and acquires an image at the higher magnification. Where the resolution is sufficient, the mobile device decodes the barcode at operation 825, and then reverses the zoom after decoding the barcode (and/or decodes other barcodes detected before reversing zoom). In some embodiments, the mobile device may repeat the operation 820 for multiple zoom increments. That being said, where the camera, either by hardware or software, is bounded by an upper magnification limit or is limited to a single zoom increment, the mobile device may optionally assess whether the additional zoom increment is permitted at operation 830. Where the camera is not permitted to zoom further, the mobile device may prompt the user at operation 835 to move the mobile device closer to the barcode, for example, by an auditory prompt, or by a visual indication presented as a graphical element (e.g., graphical element 622 of FIG. 6).

In some embodiments, a mobile device is used for decoding an optical pattern in a real scene. A mobile device may include a camera, one or more processors in communication with the camera, and one or more memory devices storing instructions. The instructions, when executed by the one or more processors, may cause the mobile device to acquire a first image of a scene using the camera, wherein a magnification of the camera is set at a first magnification. The instructions, when executed by the one or more processors, may cause the mobile device to detect an optical pattern in a region of the first image, the optical pattern encoding an object identifier. The instructions, when executed by the one or more processors, may cause the mobile device to ascertain that the region of the first image is too small to decode the optical pattern. The instructions, when executed by the one or more processors, may cause the mobile device to change a magnification of the camera from the first magnification to a second magnification, after ascertaining that the region of the first image is too small to decode the optical pattern. The instructions, when executed by the one or more processors, may cause the mobile device to acquire a second image using the camera, wherein magnification of the camera is set at the second magnification. The instructions, when executed by the one or more processors, may also cause the mobile device to decode the optical pattern in the second image, generating the object identifier.

In some embodiments, the mobile device further includes a display. Changing the magnification of the camera may include receiving a user action via the display and changing the magnification of the camera from the first magnification to the second magnification after receiving the user action. The magnification may be limited to a set of magnifications including the first magnification and the second magnification. Each magnification of the set of magnifications may be separated by an increment of at least 0.5×. The user action may be a first user action. The instructions, when executed, may further cause the one or more processors to receive a second user action via the display and change the magnification of the camera from the second magnification to a third magnification of the set of magnifications after receiving the second user action. The third magnification may be greater than the second magnification and the second magnification may be greater than the first magnification. The first user action and the second user action may be or include a user screen tap on the display. The instructions, when executed, may further cause the one or more processors to wait for a period of time after ascertaining that the region of the first image is too small to decode the optical pattern before changing the magnification of the camera. The period of time may be at least 1 second. The instructions, when executed, may further cause the one or more processors to change the magnification of the camera from the second magnification to the first magnification, after decoding the optical pattern.

C. Focus Strategies

Figure 9:
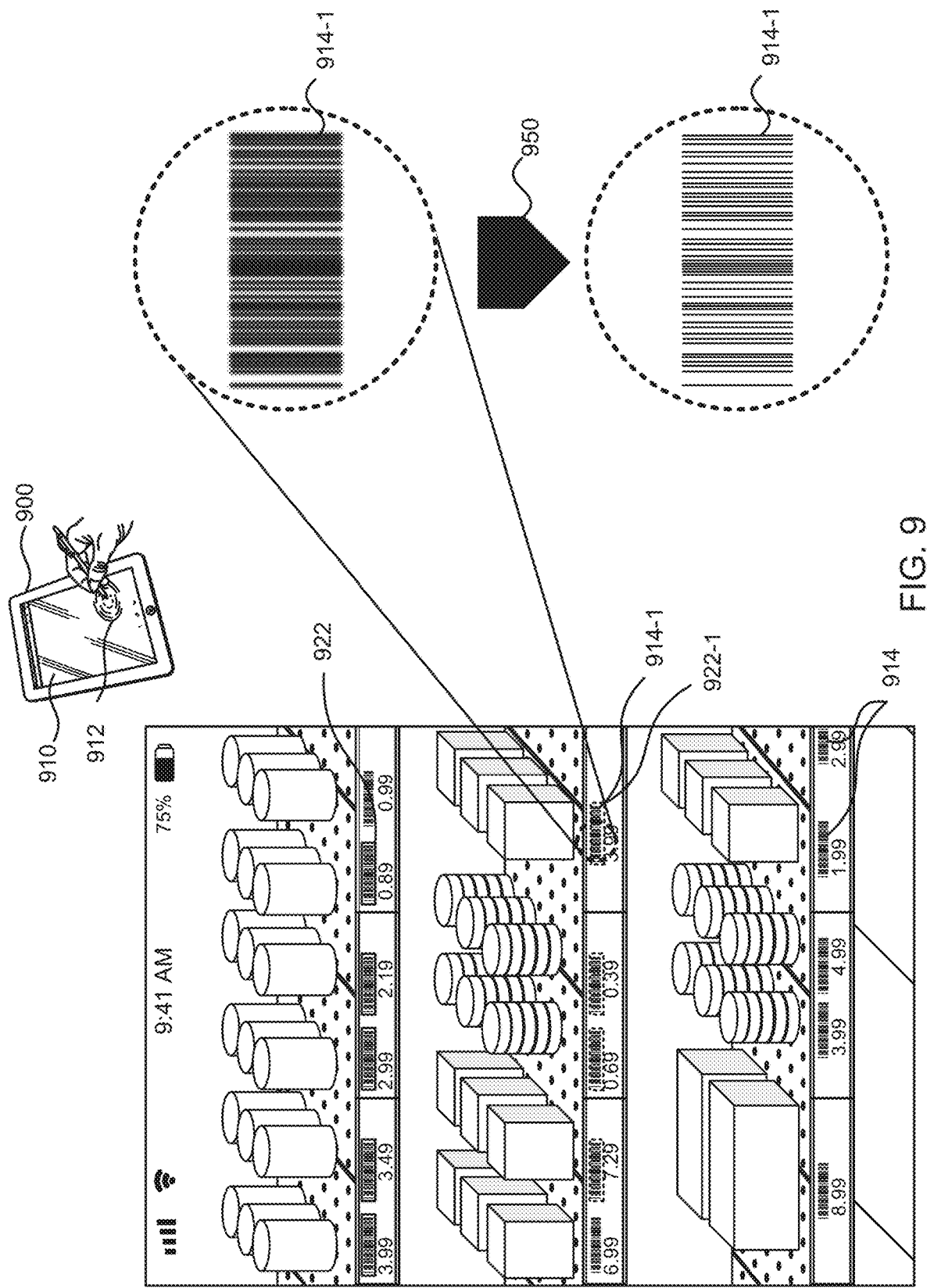
FIG. 9 depicts an example technique for focus control to facilitate decoding of a pattern in an image of a real scene, in accordance with some embodiments.

FIG. 9 depicts an example technique for focus control to facilitate decoding of a pattern in an image of a real scene, in accordance with some embodiments. Mobile devices having a camera often use an auto-focus feature while the camera is operating. The auto-focus (AF) feature is used to trigger a focus of the camera. When a focus of the camera is triggered, the camera implements a focus algorithm to find a sharp image. For example, the camera can adjust focus from a minimum value to a maximum value and set the focus where a portion of a scene is considered sharp (or sharpest). In some cases, the AF feature is optimized to identify and focus on faces, which may prove ineffective when the mobile device is aimed at a scene including optical patterns.

While the auto-focus feature is often helpful for recreational photography, the auto-focus feature can slow down scanning (e.g., detecting and/or decoding) optical patterns. For example, scanning optical patterns can be interrupted during the focus algorithm of the camera and/or tracking of optical patterns can be lost. Furthermore, scanning speed is often more important than image quality for detection and decoding processes. For example, an image slightly out of focus might be considered unacceptable for recreational photography but acceptable for scanning optical patterns. To that end, a system 900 may disable an AF feature of the camera and/or one or more focus strategies below may be implemented.

A real scene may include multiple optical patterns 914, as in the retail shelving environment described in reference to FIG. 2. In an illustrative example, the system 900 is a tablet or a smartphone incorporating a camera that is controlled by software stored in memory of the system 900. In some cases, as when the depth of field of the camera is limited, an AF feature of the system 900 may set the focus position of the camera such that optical patterns 914 at eye-level are in focus, while those optical patterns 914 on lower shelves are out of focus. In this way, images captured by the camera include optical patterns 914 that can be decoded on the top shelf, are detected on the middle shelf, and are undetected on the lower shelf. For those optical patterns 914 appearing in focus, the system 900 may generate and/or present graphical elements 922 overlaid on the optical patterns 914. In contrast, a first optical pattern 914-1 on the middle shelf, detected but not decoded, may be identified by a first graphical element 922-1, indicating that the first optical pattern 914-1 is detected, but is out of focus and cannot be decoded by the system 900.

In some embodiments, the system 900 may implement manual or automatic focus control strategies to capture an image of the real scene in which the first optical pattern 914-1 is in focus (operation 950). For example, the system 900 may receive a user action 912 that triggers a single focus cycle. The user action 912 may be a user interaction with a display 910 of the system (e.g., a screen tap), and may cause the system 900 to focus on features in a region of the image corresponding with the user action 912. For example, a screen tap on the display 910 in the region of the first optical pattern 914-1 may cause the system 900 to focus on the first optical pattern 914-1, rather than on those optical patterns 914 appearing on the top shelf nearer the system 900.

The focus strategy can be implemented on an application level (e.g., instead of a driver level). In some embodiments, a plurality of camera types (e.g., different makes, models, software versions, etc.) are tested and a focus strategy for each camera type is selected. Thus different focus strategies can be used for different devices (e.g., by evaluating focus strategies under different conditions and selecting one that performs best, or to a threshold criteria, depending on the device a scanning application runs on). In some embodiments, the system 900 references a list of allowed devices, determines that the auto-focus feature is not disabled, and disables the auto-focus if the device is not on the list of allowed devices. In this way, the system 900 may execute a scanning application (e.g., where the scanning application runs on a mobile device and is used to detect and/or decode optical patterns) may check a model of a mobile device running the scanning application, and may select a focus strategy (and/or other strategy disclosed herein) based on the model of device. The focus strategy may include disabling an AF feature of a camera of the mobile device and/or disabling image enhancement features of the camera (e.g., motion compensation features or face-recognition adaptive metering, etc.).

In some embodiments, the system 900 may employ a focus strategy that includes a fixed focal position of the camera. For example, a mobile device is set at a known height from a table. Documents with the optical patterns are placed on the table. After the scanning application initializes, the focus is set to a predetermined (e.g., a saved) focus, which can improve scanning small optical patterns by reducing the number of repeated focus cycles. By using a fixed focus, the camera does not try to refocus as documents are removed and/or added to the table. In another implementation, a fixed focal position can be used to scan codes on sides of objects on a conveyer belt; as there is a gap between objects on the conveyer belt, the fixed focus can keep the camera from trying to refocus at a far distance during periods between objects. The camera focal position can be set (e.g., fixed) manually, by software, or by a user triggering a focus algorithm manually (e.g., with continuous autofocus disabled).

Figure 10:
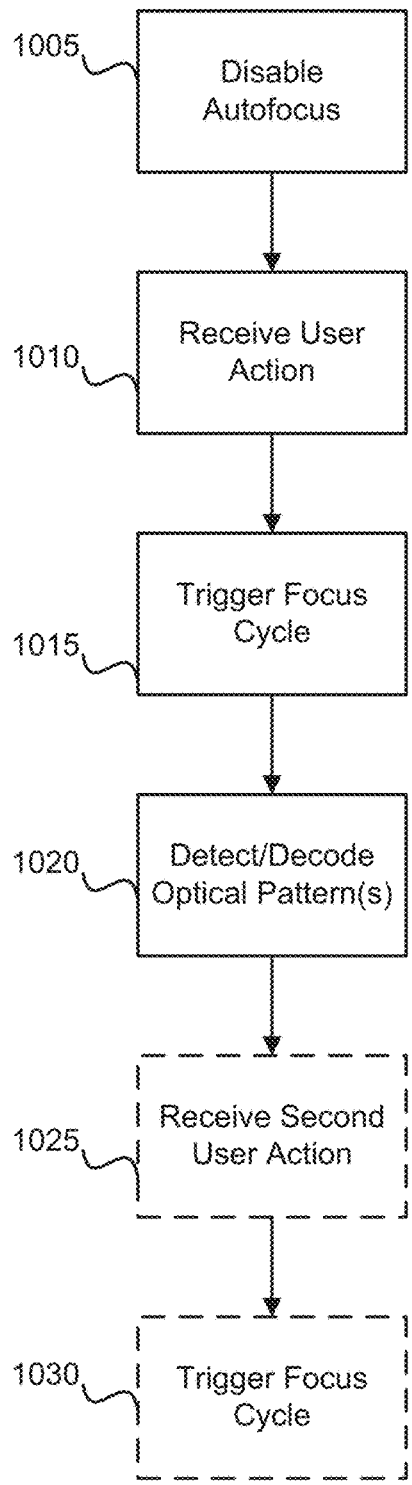
FIG. 10 depicts an example block flow diagram describing manual focus control to facilitate decoding of a pattern in an image of a real scene, in accordance with some embodiments.
Figure 10:
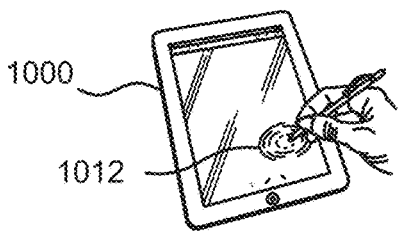
Figure 10:
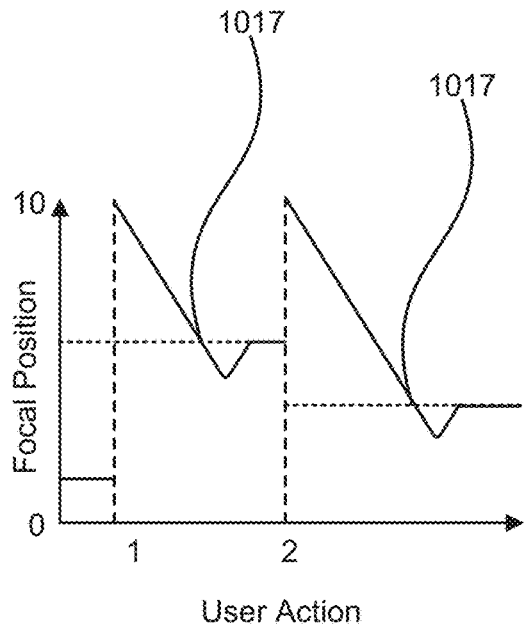

FIG. 10 depicts an example block flow diagram describing manual focus control to facilitate decoding of a pattern in an image of a real scene, in accordance with some embodiments. For example, the AF feature can be disabled at operation 1005. Disabling the AF feature permits a system 1000 implementing the operations to reduce redundant focus cycles and reduces the likelihood that the camera will focus on a feature other than an optical pattern. The focus algorithm can be triggered manually at operation 1010 by receiving a user action 1012. In some embodiments, the system 1000 does not implement the focus algorithm until there is a tap on a screen of the mobile device (e.g., user action 912 of FIG. 9).

After receiving the user action, the system triggers a focus cycle 1017 at operation 1015. The focus cycle 1017 may include, but is not limited to, a single iteration of an AF feature of the system 1000, a focus algorithm tuned to focus on optical patterns, or an increment between fixed focal positions with accompanying graphical elements indicating if the detected optical pattern is decoded. In this way, the optical patterns in the camera of the system 1000 may be focused onto the optical patterns, and the optical patterns may be decoded at operation 1020. The process of triggering focus cycles may be repeated for a real scene including multiple optical patterns at different locations. For example, the system 1000 may receive a second user action 1012 at operation 1025, and in response may trigger the focus cycle 1017 at operation 1030 to focus on a different optical pattern at a different focal position. In some embodiments, the user action 1012 is combined with instructions to the user. For example, a store employee could scan barcodes at one shelf and then be instructed to tap a button to move to a new row of shelves. After the store employee taps the button to move to another row, the focus cycle 1017 is triggered and the camera refocuses.

Figure 11:
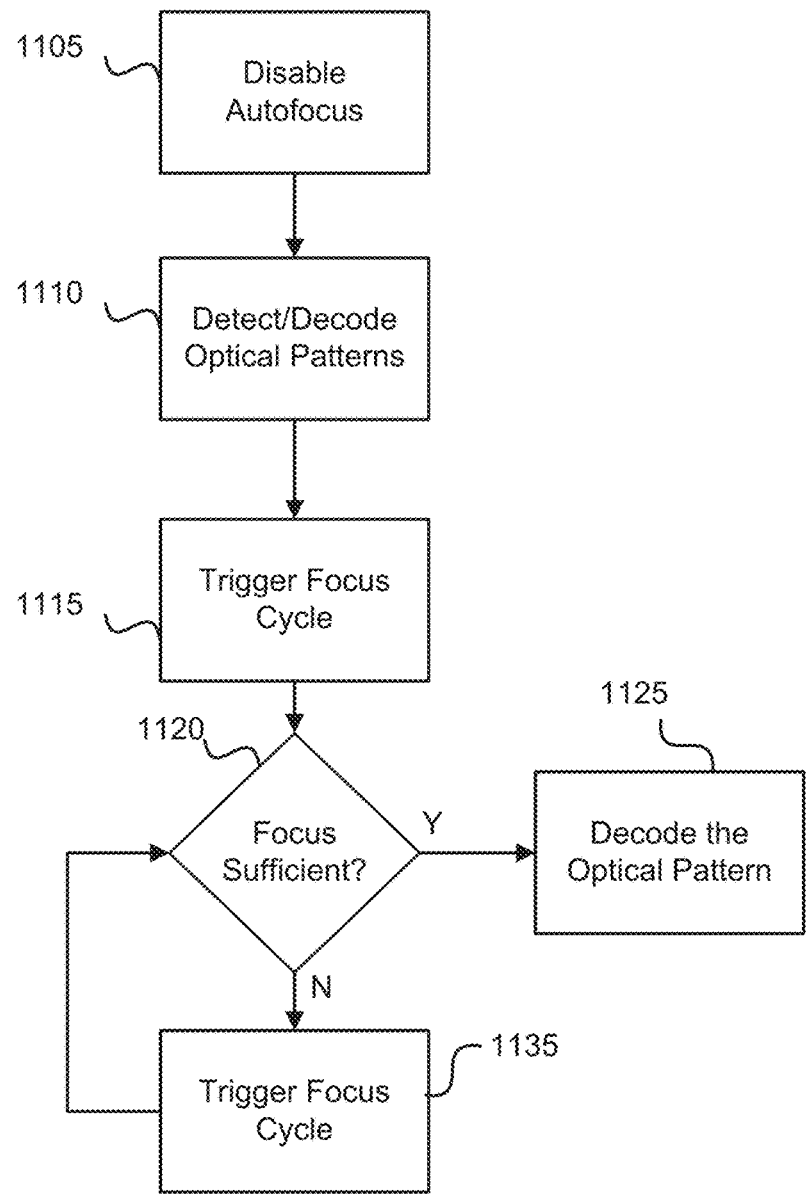
FIG. 11 depicts an example block flow diagram describing an automatic focus control algorithm to facilitate decoding of a pattern in an image of a real scene, in accordance with some embodiments.

FIG. 11 depicts an example block flow diagram describing an automatic focus control algorithm 1100 to facilitate decoding of a pattern in an image of a real scene, in accordance with some embodiments. The focus algorithm of a camera can be triggered (e.g., automatically) if an optical pattern is detected, but is out of focus in an image of the real scene to be used in decoding the optical patterns. Thus the mobile device can be used to scan multiple optical patterns quickly without focus being triggered until an optical pattern cannot be decoded. As opposed to typical AF features where the trigger includes an evaluation of whether an object or person in the real scene is in focus, as determined by the AF algorithm, the system may trigger a focus cycle without explicitly focusing on an optical pattern. In an illustrative example, a mobile device including a camera runs a scanning application implementing the automatic focus control algorithm 1100, a user of the mobile device points the camera toward a group of barcodes on two storage shelves. The mobile device detects and decodes a first sub-group of barcodes on a first shelf, and triggers a focus cycle to decode a second sub-group of barcodes on a second shelf.

In another illustrative example, the system can trigger a focus cycle of a camera after detecting on a scene change. For example, the system may ascertain a motion estimation value (MEV), and may trigger a focus cycle if the MEV exceeds a threshold value. Similarly, motion data from an inertial measurement unit or gyroscope included in the system can be used (e.g., by itself or in combination with a visual technique). The MEV can be calculated by identifying edges and calculating how many edges there are in an image and/or how strong the edges are. In some embodiments, a full image intensity plane or a cropped area from intensity of an image plane is used to calculate the MEV. In some embodiments, when the MEV is above a first threshold, it means that there is a big movement in a camera's field of view. When the MEV drops below a second threshold and remains below the second threshold for a predetermined amount of time (e.g., for less than 1 second, 1, 2, 3, 4, 5, 6, or 10 seconds, or more) and/or frames (e.g., for 20, 30, or 60 frames), the system can determine that the camera is stabilized on a new scene, and the focus algorithm is triggered. The second threshold can be the same as the first threshold. When the MEV is above the first threshold, the system stops scanning for codes until the MEV is below the second threshold. In some embodiments, a brightness value is recorded and as the brightness value changes beyond a threshold value, then the focus algorithm is triggered.

An embodiment of a process for calculating MEV comprises: detecting edges (e.g., using a convolution filter); identifying high contrast areas (e.g., more high contrast areas produce a lower MEV because higher contrast areas can mean less motion blur); and/or comparing a convolution value frame to frame (higher differences frame to frame increase the MEV). As MEV drops, the focus algorithm is triggered. In some embodiments, homography is used to calculate a scene change (e.g., movement from one row to another row).

In some configurations, a barcode is detected and the scanning application triggers the focus algorithm to focus on the barcode (e.g., if the barcode could not be decoded). For example, a barcode is detected in a plurality of images, and a spatial area of the images where the barcode is detected is used for determining the focus. Some cameras have a mode to focus on faces as a priority. If so, face-priority focus could be deactivated and a barcode priority could be used for focus processes.

As illustrated in FIG. 11, an example automatic focus strategy includes disabling an AF feature of a camera at operation 1105. The system implementing the automatic focus strategy may disable the AF feature before scanning for optical patterns in an image of a real scene acquired by the camera at operation 1110. Scanning for optical patterns may include, but is not limited to, detecting optical patterns, recognizing optical patterns, decoding optical patterns, or generating and/or presenting graphical elements as described in more detail in reference to FIGS. 1-2, above. When one or more optical patterns are detected that cannot be decoded, the system may trigger a focus cycle, which may or may not be centered on an optical pattern that was not decoded at operation 1115. As described previously, the system may be unable to decode an optical pattern for more than one reason, such as that the optical pattern is overexposed or is too small in the image. To ascertain whether the codes are in focus at operation 1120, the system may compare a focus measurement of detected optical patterns against a threshold, and if focus is sufficient, the system decodes the optical pattern at operation 1125. In some embodiments, the system may implement operation 1120 by attempting to decode the optical patterns in the image of the real scene without additional evaluation (e.g., by ascertaining a resolution of the optical patterns). Where the optical patterns remain out of focus after the focus cycle, the system may trigger one or more additional focus cycles at operation 1135, until every optical pattern in the camera's FOV is decoded. In some embodiments, the system may reactivate the AF feature of the camera after all the optical patterns are successfully decoded.

D. Multi-Threading

Figure 12:
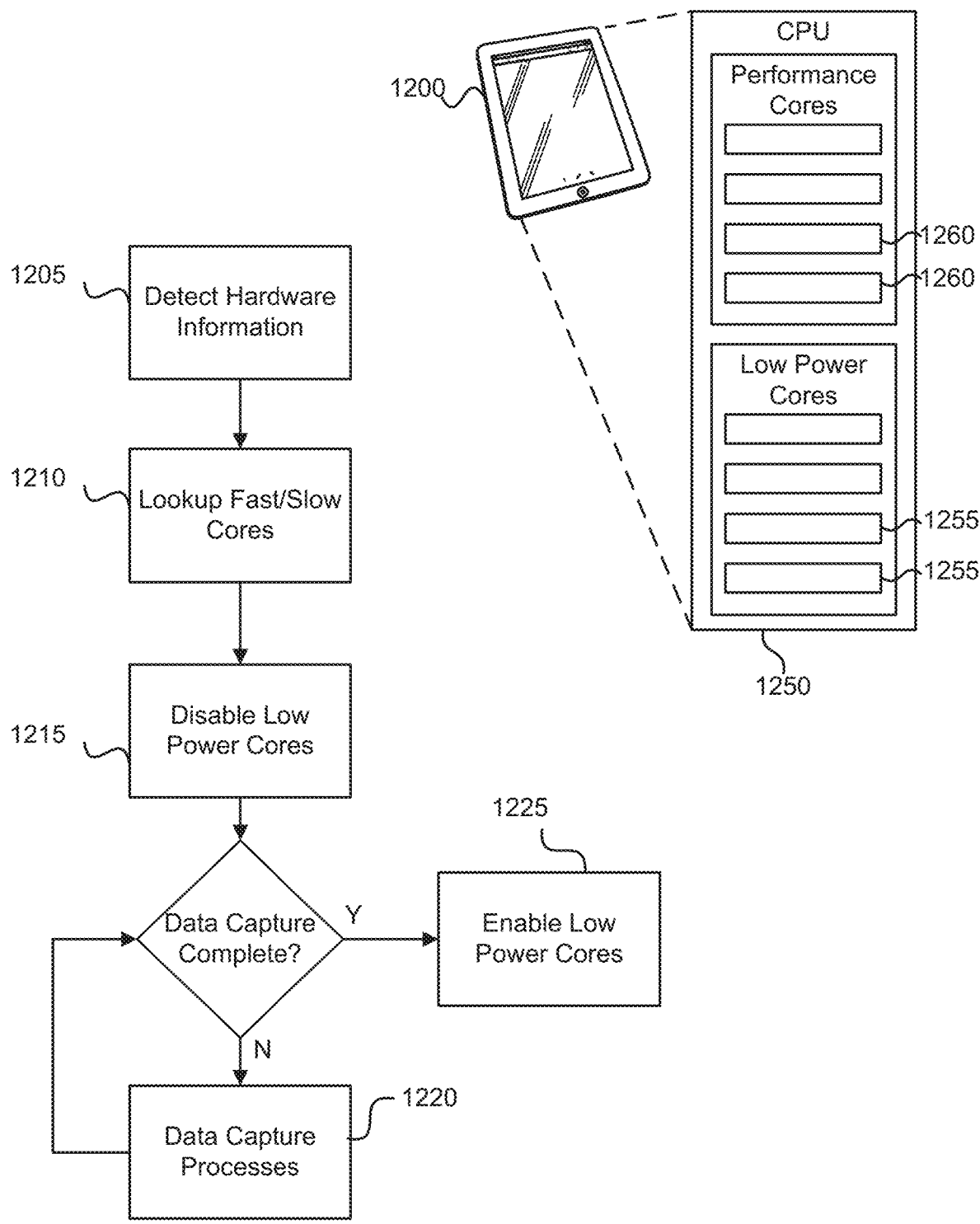
FIG. 12 depicts an example block flow diagram describing multi-core processor threading to facilitate decoding of a pattern in an image of a real scene, in accordance with some embodiments.

FIG. 12 depicts an example block flow diagram describing multi-core processor threading to facilitate decoding of a pattern in an image of a real scene, in accordance with some embodiments.

Some mobile device have CPUs with different core types (e.g., a big. LITTLE architecture), where a subset of the cores are optimized for high performance, others for low power consumption. Depending on which core code gets executed by, execution may be significantly slower (up to 2× slower). Scheduling is done by the operating system and as such, scheduling decisions may follow criteria based on system priorities, rather than application priorities. By providing direction or hints to the operating system on which cores certain code is to be executed, runtime performance of a scanning application can be optimized.

FIG. 12 depicts an example block flow diagram describing multi-core processor threading to facilitate decoding of a pattern in an image of a real scene, in accordance with some embodiments. In an illustrative embodiment, the system 1200 is a mobile device having a multi-core processor 1250. The multi-core processor 1250 includes a core configuration of low power cores 1255, and high performance cores 1260. In a default configuration, without restrictions, operations of a scanning application can be executed on either low power cores 1255 or high performance cores 1260, sometimes switching between cores. The system 1200 may restrict processing to the high performance cores 1260, such that detection, decoding, and performance improvement strategies (e.g., exposure, zoom, focus, etc.) can be improved in terms of execution time.

In an embodiment of a method for multi-threading, the system 1200 detects hardware information describing the multi-core processor 1250 at operation 1205. The system 1200 looks up identifiers for the low power cores 1255 and the high performance cores 1260, at operation 1210, to identify the cores of the multi-core processor 1250. Based on the core information, the system 1200 enables the scanning application to execute on only the performance cores 1260. The system 1200 scans the optical patterns at operation 1220, until all the optical patterns included are processed (e.g., detected and/or decoded), after which, the low power cores 1255 are enabled at operation 1225.

In an illustrative example where the system 1200 is a mobile phone, the system 1200 may determine a phone model to identify those cores of the phone processor that are high speed cores, and prevents the scanning application from executing operations on other cores while data capturing processes are running. After data capture finishes, the restriction on using other cores is removed. Such an approach permits the system 1200 to process and capture data encoded in optical patterns more rapidly, with less latency, and further permits the parallelization of operations without operations being shifted to low power cores 1255, which improves the speed of the scanning application.

In some embodiments, a mobile device is used for decoding an optical pattern in a real scene. A mobile device may include a display, a camera, one or more processors in communication with the camera and with the display, and one or more memory devices storing instructions. The instructions, when executed by the one or more processors, may cause the mobile device to detect a hardware configuration of the one or more processors. The instructions, when executed by the one or more processors, may cause the mobile device to identify a first core of the one or more processors, the first core being a high performance core. The instructions, when executed by the one or more processors, may cause the mobile device to identify a second core of the one or more processors, the second core being a low power core. The instructions, when executed by the one or more processors, may also cause the mobile device to execute, using the first core of the one or more processors, further instructions that, when executed by the first core, may cause the one or more processors to detect a plurality of optical patterns in a scene, the optical patterns encoding a plurality of object identifiers. The further instructions, when executed by the first core, may cause the one or more processors to acquire one or more images of the scene using the camera, the one or more images including the plurality of optical patterns. The further instructions, when executed by the first core, may also cause the one or more processors to decode the plurality of optical patterns in the one or more images of the scene, generating the plurality of object identifiers.

In some embodiments, the optical pattern may be or include a barcode constructed of parallel bars. The instructions, when executed by the one or more processors, may further cause the one or more processors to disable the second core after identifying the second core and before detecting the plurality of optical patterns in the scene and enable the second core after decoding the plurality of optical patterns. The instructions, when executed by the one or more processors, may further cause the one or more processors to identify a third core of the one or more processors, the third core being a high performance core. The further instructions may be executed by the first core and the third core, but not executed by the second core.

E. System Architecture

Figure 13:
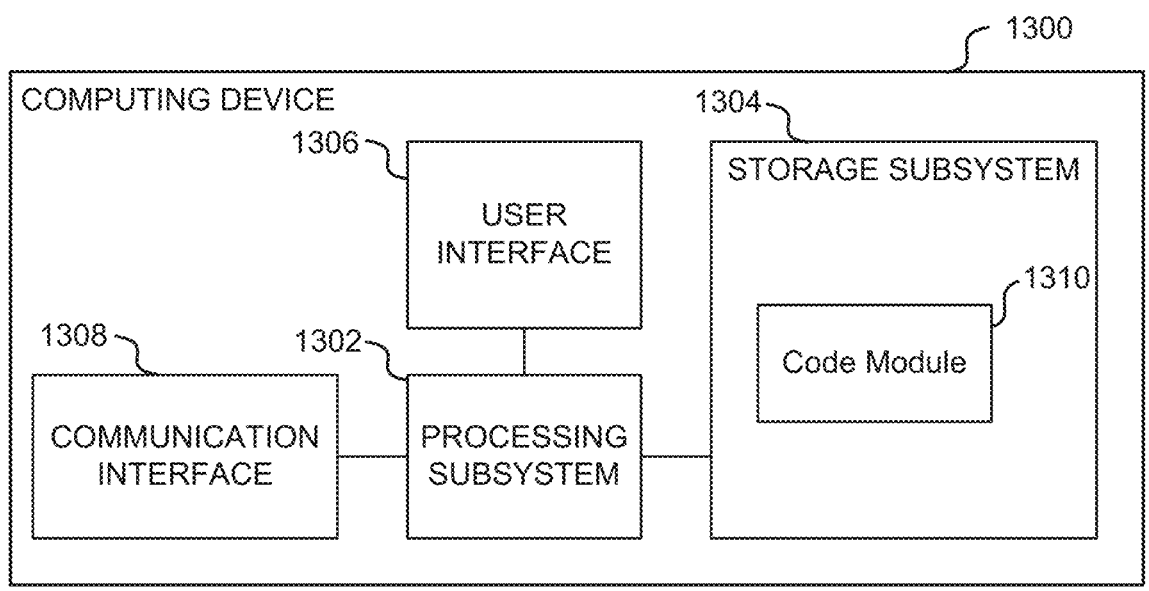
FIG. 13 depicts a block diagram of an embodiment of a computer system.

FIG. 13 is a simplified block diagram of a computing device 1300. Computing device 1300 can implement some or all functions, behaviors, and/or capabilities described above that would use electronic storage or processing, as well as other functions, behaviors, or capabilities not expressly described. Computing device 1300 includes a processing subsystem 1302, a storage subsystem 1304, a user interface 1306, and/or a communication interface 1308. Computing device 1300 can also include other components (not explicitly shown) such as a battery, power controllers, and other components operable to provide various enhanced capabilities. In various embodiments, computing device 1300 can be implemented in a desktop or laptop computer, mobile device (e.g., tablet computer, smart phone, mobile phone), wearable device, media device, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electronic units designed to perform a function or combination of functions described above.

Storage subsystem 1304 can be implemented using a local storage and/or removable storage medium, e.g., using disk, flash memory (e.g., secure digital card, universal serial bus flash drive), or other nontransitory storage medium, or a combination of media, and can include volatile and/or nonvolatile storage media. Local storage can include random access memory (RAM), including dynamic RAM (DRAM), static RAM (SRAM), or battery backed up RAM. In some embodiments, storage subsystem 1304 can store one or more applications and/or operating system programs to be executed by processing subsystem 1302, including programs to implement some or all operations described above that would be performed using a computer. For example, storage subsystem 1304 can store one or more code modules 1310 for implementing one or more method steps described above.

A firmware and/or software implementation may be implemented with modules (e.g., procedures, functions, and so on). A machine-readable medium tangibly embodying instructions may be used in implementing methodologies described herein. Code modules 1310 (e.g., instructions stored in memory) may be implemented within a processor or external to the processor. As used herein, the term "memory" refers to a type of long term, short term, volatile, nonvolatile, or other storage medium and is not to be limited to particular types of memory or number of memories or type of media upon which memory is stored.

Moreover, the term "storage medium" or "storage device" may represent one or more memories for storing data, including read only memory (ROM), RAM, magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, wireless channels, and/or various other storage mediums capable of storing instruction(s) and/or data.

Furthermore, embodiments may be implemented by hardware, software, scripting languages, firmware, middleware, microcode, hardware description languages, and/or combinations thereof. When implemented in software, firmware, middleware, scripting language, and/or microcode, program code or code segments to perform tasks may be stored in a machine readable medium such as a storage medium. A code segment (e.g., code module 1310) or machine-executable instruction may represent a procedure, a function, a subprogram, a program, a routine, a subroutine, a module, a software package, a script, a class, or a combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted by suitable means including memory sharing, message passing, token passing, network transmission, etc.

Implementation of the techniques, blocks, steps and means described above may be done in various ways. For example, these techniques, blocks, steps and means may be implemented in hardware, software, or a combination thereof. For a hardware implementation, the processing units may be implemented within one or more ASICs, DSPs, DSPDs, PLDs, FPGAs, processors, controllers, micro-controllers, microprocessors, other electronic units designed to perform the functions described above, and/or a combination thereof.

Each code module 1310 may comprise sets of instructions (codes) embodied on a computer-readable medium that directs a processor of a computing device 1300 to perform corresponding actions. The instructions may be configured to run in sequential order, in parallel (such as under different processing threads), or in a combination thereof. After loading a code module 1310 on a general purpose computer system, the general purpose computer is transformed into a special purpose computer system.

Computer programs incorporating various features described herein (e.g., in one or more code modules 1310) may be encoded and stored on various computer readable storage media. Computer-readable media encoded with the program code may be packaged with a compatible electronic device, or the program code may be provided separately from electronic devices (e.g., via Internet download or as a separately packaged computer readable storage medium). Storage subsystem 1304 can also store information useful for establishing network connections using the communication interface 1308.

User interface 1306 can include input devices (e.g., touch pad, touch screen, scroll wheel, click wheel, dial, button, switch, keypad, microphone, etc.), as well as output devices (e.g., video screen, indicator lights, speakers, headphone jacks, virtual- or augmented-reality display, etc.), together with supporting electronics (e.g., digital to analog or analog to digital converters, signal processors, etc.). A user can operate input devices of user interface 1306 to invoke the functionality of computing device 1300 and can view and/or hear output from computing device 1300 via output devices of user interface 1306. For some embodiments, the user interface 1306 might not be present (e.g., for a process using an ASIC).

Processing subsystem 1302 can be implemented as one or more processors (e.g., integrated circuits, one or more singlecore or multicore microprocessors, microcontrollers, central processing unit, graphics processing unit, etc.). In operation, processing subsystem 1302 can control the operation of computing device 1300. In some embodiments, processing subsystem 1302 can execute a variety of programs in response to program code and can maintain multiple concurrently executing programs or processes. At a given time, some or all of a program code to be executed can reside in processing subsystem 1302 and/or in storage media, such as storage subsystem 1304. Through programming, processing subsystem 1302 can provide various functionality for computing device 1300. Processing subsystem 1302 can also execute other programs to control other functions of computing device 1300, including programs that may be stored in storage subsystem 1304.

Communication interface 1308 can provide voice and/or data communication capability for computing device 1300. In some embodiments, communication interface 1308 can include radio frequency (RF) transceiver components for accessing wireless data networks (e.g., Wi-Fi network; 3G, 4G/LTE; etc.), mobile communication technologies, components for shortrange wireless communication (e.g., using Bluetooth communication standards, NFC, etc.), other components, or combinations of technologies. In some embodiments, communication interface 1308 can provide wired connectivity (e.g., universal serial bus, Ethernet, universal asynchronous receiver/transmitter, etc.) in addition to, or in lieu of, a wireless interface. Communication interface 1308 can be implemented using a combination of hardware (e.g., driver circuits, antennas, modulators/demodulators, encoders/decoders, and other analog and/or digital signal processing circuits) and software components. In some embodiments, communication interface 1308 can support multiple communication channels concurrently. In some embodiments the communication interface 1308 is not used.

It will be appreciated that computing device 1300 is illustrative and that variations and modifications are possible. A computing device can have various functionality not specifically described (e.g., voice communication via cellular telephone networks) and can include components appropriate to such functionality.

Further, while the computing device 1300 is described with reference to particular blocks, it is to be understood that these blocks are defined for convenience of description and are not intended to imply a particular physical arrangement of component parts. For example, the processing subsystem 1302, the storage subsystem, the user interface 1306, and/or the communication interface 1308 can be in one device or distributed among multiple devices.

Further, the blocks need not correspond to physically distinct components. Blocks can be configured to perform various operations, e.g., by programming a processor or providing appropriate control circuitry, and various blocks might or might not be reconfigurable depending on how an initial configuration is obtained. Embodiments of the present invention can be realized in a variety of apparatus including electronic devices implemented using a combination of circuitry and software. Electronic devices described herein can be implemented using computing device 1300.

Various features described herein, e.g., methods, apparatus, computer readable media and the like, can be realized using a combination of dedicated components, programmable processors, and/or other programmable devices. Processes described herein can be implemented on the same processor or different processors. Where components are described as being configured to perform certain operations, such configuration can be accomplished, e.g., by designing electronic circuits to perform the operation, by programming programmable electronic circuits (such as microprocessors) to perform the operation, or a combination thereof. Further, while the embodiments described above may make reference to specific hardware and software components, those skilled in the art will appreciate that different combinations of hardware and/or software components may also be used and that particular operations described as being implemented in hardware might be implemented in software or vice versa.

Specific details are given in the above description to provide an understanding of the embodiments. However, it is understood that the embodiments may be practiced without these specific details. In some instances, well-known circuits, processes, algorithms, structures, and techniques may be shown without unnecessary detail in order to avoid obscuring the embodiments.

While the principles of the disclosure have been described above in connection with specific apparatus and methods, it is to be understood that this description is made only by way of example and not as limitation on the scope of the disclosure. Embodiments were chosen and described in order to explain the principles of the invention and practical applications to enable others skilled in the art to utilize the invention in various embodiments and with various modifications, as are suited to a particular use contemplated. It will be appreciated that the description is intended to cover modifications and equivalents.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc.

A recitation of "a", "an", or "the" is intended to mean "one or more" unless specifically indicated to the contrary. Patents, patent applications, publications, and descriptions mentioned here are incorporated by reference in their entirety for all purposes. None is admitted to be prior art.

What is claimed is:

1. A system for decoding optical patterns in a real scene using multi-threading, the system comprising:
   a camera;
   one or more processors; and
   one or more memory devices storing instructions that, when executed, cause the one or more processors to perform the following steps:
      acquiring an image of a scene using the camera of a device;
      detecting hardware information of the device, wherein:
         the hardware information describes a multi-core processor; and
         the multi-core processor comprises first core and a second core; and
         the first core is a higher-performance core than the second core;
      identifying the first core;
      restricting an application for optical pattern scanning to run on the first core, and not the second core, based on identifying the first core as the higher-performance core;
      decoding an optical pattern in the image using the application for optical pattern scanning running on the first core, wherein the optical pattern encodes an object identifier; and
      enabling the application for optical pattern scanning to run on the second core, after decoding the optical pattern in the image.

2. The system of claim 1, wherein the instructions, when executed, cause the one or more processors to identify the second core.

3. The system of claim 1, wherein identifying the first core comprises looking up identifiers for the first core and the second core.

4. The system of claim 1, wherein:
   restricting the application for optical pattern scanning to run on the first core comprises disabling the second core, before decoding the optical pattern in the image; and
   enabling the application for optical pattern scanning to run on the second core comprises enabling the second core after the optical pattern is decoded.

5. The system of claim 1, wherein the instructions, when executed, cause the one or more processors to perform the following steps:
   identifying a third core, the third core being a high-performance core; and
   restricting the application for optical pattern scanning to run on the first core and the third core, and not the second core, based on identifying the first core and the third core as higher-performance cores.

6. The system of claim 1, wherein the instructions, when executed, cause the one or more processors to track the optical pattern in a plurality of images before acquiring the image of the scene.

7. The system of claim 1, wherein the optical pattern is a barcode comprising parallel bars.

8. The system of claim 1, wherein the device is a mobile phone.

9. A method for decoding optical patterns in a real scene using multi-threading, the method comprising:
   acquiring an image of a scene using a camera of a device;
   detecting hardware information of the device, wherein:
      the hardware information describes a multi-core processor; and the multi-core processor comprises first core and a second core; and the first core is a higher-performance core than the second core;

identifying the first core;

restricting an application for optical pattern scanning to run on the first core, and not the second core, based on identifying the first core as the higher-performance core;

decoding an optical pattern in the image using the application for optical pattern scanning running on the first core, wherein the optical pattern encodes an object identifier; and enabling the application for optical pattern scanning to run on the second core, after decoding the optical pattern in the image.

10. The method of claim 9, comprising identifying the second core.

11. The method of claim 9, wherein identifying the first core comprises looking up identifiers for the first core and the second core.

12. The method of claim 9, wherein:

restricting the application for optical pattern scanning to run on the first core comprises disabling the second core, before decoding the optical pattern in the image; and enabling the application for optical pattern scanning to run on the second core comprises enabling the second core after the optical pattern is decoded.

13. The method of claim 9, comprising:

identifying a third core, the third core being a high-performance core; and restricting the application for optical pattern scanning to run on the first core and the third core, and not the second core, based on identifying the first core and the third core as higher-performance cores.

14. The method of claim 9, further comprising tracking the optical pattern in a plurality of images before acquiring the image of the scene.

15. The method of claim 9, wherein the optical pattern is a barcode comprising parallel bars.

16. A memory device comprising instructions that, when executed, cause one or more processors to perform the following steps:

acquiring an image of a scene using a camera of a device;

detecting hardware information of the device, wherein:

the hardware information describes a multi-core processor; and the multi-core processor comprises first core and a second core; and the first core is a higher-performance core than the second core;

identifying the first core;

restricting an application for optical pattern scanning to run on the first core, and not the second core, based on identifying the first core as the higher-performance core;

decoding an optical pattern in the image using the application for optical pattern scanning running on the first core, wherein the optical pattern encodes an object identifier; and enabling the application for optical pattern scanning to run on the second core, after decoding the optical pattern in the image.

17. The memory device of claim 16, wherein the instructions, when executed, cause the one or more processors to identify the second core.

18. The memory device of claim 16, wherein identifying the first core comprises looking up identifiers for the first core and the second core.

19. The memory device of claim 16, wherein:

restricting the application for optical pattern scanning to run on the first core comprises disabling the second core, before decoding the optical pattern in the image; and enabling the application for optical pattern scanning to run on the second core comprises enabling the second core after the optical pattern is decoded.

20. The memory device of claim 16, wherein the instructions, when executed, cause the one or more processors to perform the following steps:

identifying a third core, the third core being a high-performance core; and restricting the application for optical pattern scanning to run on the first core and the third core, and not the second core, based on identifying the first core and the third core as higher-performance cores.

* * * * *